(12) United States Patent
Akutsu

(10) Patent No.: US 9,519,554 B2
(45) Date of Patent: Dec. 13, 2016

(54) STORAGE SYSTEM WITH REBUILD OPERATIONS

(71) Applicant: Hitachi, Ltd., Tokyo (JP)

(72) Inventor: Hiroaki Akutsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 169 days.

(21) Appl. No.: 14/245,321

(22) Filed: Apr. 4, 2014

(65) Prior Publication Data

US 2014/0223223 A1     Aug. 7, 2014

Related U.S. Application Data

(63) Continuation of application No. 13/318,243, filed as application No. PCT/JP2011/005862 on Oct. 19, 2011, now Pat. No. 8,707,090.

(51) Int. Cl.
| | |
|---|---|
| *G06F 11/00* | (2006.01) |
| *G06F 11/20* | (2006.01) |
| *G06F 11/10* | (2006.01) |
| *G06F 3/06* | (2006.01) |

(52) U.S. Cl.
CPC ........... *G06F 11/2046* (2013.01); *G06F 3/061* (2013.01); *G06F 3/0646* (2013.01); *G06F 3/0689* (2013.01); *G06F 11/1076* (2013.01)

(58) Field of Classification Search
CPC ...... G06F 3/061; G06F 3/0646; G06F 3/0689; G06F 11/1076; G06F 11/1088; G06F 11/1092; G06F 11/1458; G06F 11/1469; G06F 11/2046
See application file for complete search history.

(56) References Cited

U.S. PATENT DOCUMENTS

| | | | |
|---|---|---|---|
| 5,522,031 A | * | 5/1996 | Ellis .................... G06F 11/1092 714/6.22 |
| 5,720,025 A | | 2/1998 | Wilkes et al. |
| 5,761,402 A | | 6/1998 | Kaneda et al. |

(Continued)

FOREIGN PATENT DOCUMENTS

| | | |
|---|---|---|
| JP | 2002-278707 A | 9/2002 |
| JP | 2006-107311 A | 4/2006 |

(Continued)

OTHER PUBLICATIONS

Hou, et al., Balancing I/O Response Time and Disk Rebuild Time in a RAID5 Disk Array, 1993, IEEE, pp. 70-79.*

(Continued)

*Primary Examiner* — Marc Duncan
(74) *Attorney, Agent, or Firm* — Foley & Lardner LLP

(57) ABSTRACT

In a storage system which supports a redundant disk configuration, while securing fault tolerance, a longer drive access time as well as a drop in I/O throughput are prevented when a redundant data update, generated due to a data update, is mirrored in the drive.

A controller for controlling data I/O to and from the drive updates first redundant data and block data of a corresponding data stripe in the disk drive in correspondence with an update of block data of the logical volume, and the controller updates second redundant data on the basis of a predetermined number of block data which belong to the same data stripe as the updated block data with different timing from the update of the block data.

13 Claims, 28 Drawing Sheets

(56) References Cited

U.S. PATENT DOCUMENTS

| | | | | |
|---|---|---|---|---|
| 5,822,584 | A * | 10/1998 | Thompson | G06F 9/4843 714/E11.034 |
| 5,958,067 | A * | 9/1999 | Kaneda | G06F 3/0613 714/6.1 |
| 6,101,615 | A | 8/2000 | Lyons | |
| 6,625,748 | B1 * | 9/2003 | Tanaka | G06F 11/1084 714/6.12 |
| 6,675,318 | B1 | 1/2004 | Lee | |
| 6,732,232 | B2 * | 5/2004 | Krishnamurthy | G06F 9/5011 711/114 |
| 7,139,931 | B2 * | 11/2006 | Horn | G06F 11/1092 711/114 |
| 7,234,077 | B2 * | 6/2007 | Curran | G06F 11/1435 707/999.202 |
| 7,350,101 | B1 * | 3/2008 | Nguyen | G06F 11/1084 711/114 |
| 7,386,758 | B2 * | 6/2008 | Kitamura | G06F 11/1092 707/999.103 |
| 7,650,533 | B1 * | 1/2010 | Saxena | G06F 11/1451 714/13 |
| 7,979,635 | B2 * | 7/2011 | Bates | G06F 11/1084 711/114 |
| 8,006,128 | B2 * | 8/2011 | Olster | G06F 11/1092 714/6.32 |
| 8,726,070 | B2 * | 5/2014 | Nelogal | G06F 11/1092 714/52 |
| 8,751,861 | B2 * | 6/2014 | Nair | G06F 3/0611 714/6.21 |
| 9,274,890 | B2 * | 3/2016 | Gladwin | G06F 3/0617 |
| 9,348,696 | B2 * | 5/2016 | Colgrove | G06F 11/1076 |
| 9,389,975 | B2 * | 7/2016 | Arakawa | G06F 11/1088 |
| 2002/0059539 | A1 * | 5/2002 | Anderson | G06F 11/1096 714/6.22 |
| 2002/0166078 | A1 | 11/2002 | Oldfield et al. | |
| 2004/0010661 | A1 | 1/2004 | Katsuragi et al. | |
| 2004/0059958 | A1 * | 3/2004 | Umberger | G06F 11/1092 714/6.32 |
| 2005/0102552 | A1 * | 5/2005 | Horn | G06F 11/1092 714/6.22 |
| 2006/0041793 | A1 * | 2/2006 | Cherian | G06F 11/1092 714/47.1 |
| 2006/0080505 | A1 | 4/2006 | Arai et al. | |
| 2006/0085674 | A1 * | 4/2006 | Ananthamurthy | G11B 20/10 714/6.12 |
| 2006/0123312 | A1 | 6/2006 | Forhan et al. | |
| 2007/0088976 | A1 * | 4/2007 | Daikokuya | G06F 11/1076 714/6.12 |
| 2007/0101187 | A1 * | 5/2007 | Daikokuya | G06F 11/1076 714/6.22 |
| 2009/0106584 | A1 * | 4/2009 | Nakayama | G06F 11/0727 714/6.11 |
| 2009/0177838 | A1 * | 7/2009 | Haustein | G06F 3/0617 711/114 |
| 2012/0066449 | A1 * | 3/2012 | Colgrove | G06F 3/061 711/114 |
| 2016/0034223 | A1 * | 2/2016 | Dayal | G06F 11/22 711/114 |
| 2016/0048356 | A1 * | 2/2016 | Galloway | G06F 11/1076 711/114 |

FOREIGN PATENT DOCUMENTS

| | | |
|---|---|---|
| JP | 2009-217408 A | 9/2009 |
| WO | WO-02/08900 A2 | 1/2002 |

OTHER PUBLICATIONS

PCT International Search Report and Written Opinion on application PCT/JP2011/005862 mailed Jul. 2, 2012; 10 pages.

* cited by examiner

FIG.6

| LOGICAL VOLUME NUMBER (601) | TYPE (602) | PHYSICAL DRIVE NUMBER (603) | PHYSICAL START ADDRESS (604) | DRIVE STATE (605) |
|---|---|---|---|---|
| 201 | RAID6 | 1001 | 0x0000 | NORMAL |
|  |  | 1002 | 0x0000 | NORMAL |
|  |  | 1003 | 0x0000 | NORMAL |
|  |  | 1004 | 0x0000 | NORMAL |
|  |  | 1005 | 0x0000 | FAILED |
|  |  | 1006 | 0x0000 | NORMAL |
|  |  | 1007 | 0x0000 | NORMAL |
|  |  | 1008 | 0x0000 | NORMAL |
| 202 | RAID6 | 1009 | 0x0000 | NORMAL |
|  |  | 1010 | 0x0000 | NORMAL |
|  |  | 1011 | 0x0000 | NORMAL |
|  |  | 1012 | 0x0000 | NORMAL |
|  |  | 1013 | 0x0000 | NORMAL |
|  |  | 1014 | 0x0000 | NORMAL |
|  |  | 1015 | 0x0000 | NORMAL |
|  |  | 1016 | 0x0000 | NORMAL |
| - | Spare | 1017 | 0x0000 | NORMAL |
|  | Spare | 1018 | 0x0000 | NORMAL |

401

701
402

801        802

| LOGICAL VOLUME NUMBER | ASYNCHRONOUS AREA COUNT COUNTER |
|---|---|
| 201 | 100 |
| 202 | 0 |
| 203 | 50 |

403

| LOGICAL VOLUME NUMBER 1001 | AREA ADDRESS 1002 | ACCESS FREQUENCY COUNTER 1003 |
|---|---|---|
| 201 | 0x00000000 | 10 |
| | 0x00000010 | 3000 |
| | 0x00000020 | 0 |
| | ... | ... |
| 202 | 0x00000000 | 20 |
| | ... | ... |

| LOGICAL VOLUME NUMBER 1101 | CONFIGURATION ITEM 1102 | SETTING CONTENTS 1103 |
|---|---|---|
| 201 | REBUILD OPERATION MODE | High Speed |
| | ASYNCHRONOUS REDUNDANT DATA GENERATION MODE | ON |
| | ALLOWED DESYNCHRONIZATION CAPACITY | 100 |
| 202 | REBUILD OPERATION MODE | Normal |
| | ASYNCHRONOUS REDUNDANT DATA GENERATION MODE | ON |
| | ALLOWED DESYNCHRONIZATION CAPACITY | 1000 |

406

STORAGE SYSTEM WITH REBUILD OPERATIONS

CROSS-REFERENCE TO RELATED PATENT APPLICATIONS

This application is a Continuation of U.S. application Ser. No. 13/318,243 (National Stage of PCT/JP2011/005862), filed Oct. 31, 2011, incorporated herein by reference in its entirety.

TECHNICAL FIELD

The present invention relates to a storage system which manages a plurality of drives as redundant data storage areas.

BACKGROUND ART

A disk array system in which storage areas are configured from a plurality of HDD and SSD and the like is used as a subsystem of a mainframe or open server. In a system of this kind, the construction of a RAID environment is supported so that data is not lost even when a fault is generated in a drive.

For example, if RAID5 is constructed from four drives, a parity P1 is generated from three stripe data D1 and is stored by being divided between four drives. Further, although a parity P2 is generated from three stripe data D2 and stored by being divided between four drives, P2 is stored in a different drive from P1 so that parities are not concentrated in a single drive. In the case of this example, data can be recovered even when a fault is generated in a single drive. However, this does not cater to cases where a fault is generated in two or more drives (double fault). Meanwhile, RAID6 generates two parities. In this case, a double fault can be dealt with.

In the case of RAID5, at the time of a data update, pre-update data and parities are acquired from a drive in order to generate parities. In order to avoid waiting for the disk rotation due to this access, PTL1 discloses a technology for generating RAID5 parities asynchronously to the disk I/O.

CITATION LIST

Patent Literature

PTL 1: U.S. Pat. No. 5,720,025

SUMMARY OF INVENTION

Technical Problem

As described hereinabove, in a storage system which supports a RAID-environment structure, fault tolerance is secured by adding redundant data to user data. Here, redundant data is parity data which, in RAID1, means mirror data. There are a large number of storage systems which support RAID5 based on the fact that the overhead of the redundant data relative to the user data is small and that there is no parity-dedicated drive bottleneck as is the case with RAID3 and RAID4.

However, RAID5 is unable to cater to double faults. Although recent years have seen an increase in drive capacities, there has accordingly been an increase in the time required for fault recovery if a fault is generated in a drive. Increasing the fault recovery time also raises the risk of a double fault being generated in the drive. In order to raise the fault tolerance, consideration has been given to constructing the storage system using RAID6.

However, since, with RAID6, two new parities are generated by reading pre-update data and two parities from the drive, and post-update data and the two generated parities are written to the drive, the drive must be accessed six times in order for the updated data to be mirrored in the drive. (The extension of the drive access time will be referred to hereinbelow as the write penalty).

Here, with the present invention, in a storage system which supports a redundant disk configuration, while securing fault tolerance, it is possible to prevent a longer drive access time as well as a drop in I/O throughput when a redundant data update, generated due to a data update, is mirrored in the drive.

Solution to Problem

In order to achieve the foregoing object, in one example of the present invention, in a storage system, the first redundant data and the stripe data of the corresponding data stripe in the disk drive are updated in correspondence with an update of the stripe data of the logical volume. Further, the second redundant data is updated on the basis of the predetermined number of stripe data which belong to stripe rows which are the same as the updated stripe data with different timing from the update of the stripe data [of the data stripe].

Furthermore, in another example, in a storage system, it is possible to configure a mode, for the logical volume, in which an update of the second redundant data can be performed asynchronously to the update of the stripe data.

In addition, in another example, in a storage system, it is possible to elect to perform an update of the second redundant data which belongs to the same stripe row as the updated stripe data synchronously or asynchronously to the update of the stripe data according to the frequency of access to the updated area of the logical volume.

Further characteristics of the present invention will be described in examples described subsequently. However, this does not mean that the scope of the present invention is restricted to such examples.

Advantageous Effects of Invention

With the present invention, in a storage system which supports a redundant disk configuration, while securing fault tolerance, it is possible to prevent a longer drive access time (raise the drive utilization) as well as a drop in I/O throughput when a redundant data update, generated due to a data update, is mirrored in the drive.

BRIEF DESCRIPTION OF DRAWINGS

FIG. 6 is a constitutional view of a logical/physical address conversion table of the computer system according to the first example of the present invention.

FIG. 11 is a constitutional view of a configuration stable for the computer system according to the first example of the present invention.

DESCRIPTION OF EMBODIMENTS

Examples of the present invention will be described hereinbelow with reference to the drawings. Note that the examples illustrated hereinbelow do not limit the inventions according to the claims and there is no such limitation such as all of the particular combinations illustrated in the examples being required for the solution.

First Example

According to this example, when the drive is working normally, parity generation is carried out asynchronously to the host I/O instead of carrying out parity generation in sync with the host I/O, and when the drive fails, parity generation is performed in sync with the host I/O to restore the data in the faulty drive.

Figure 1:
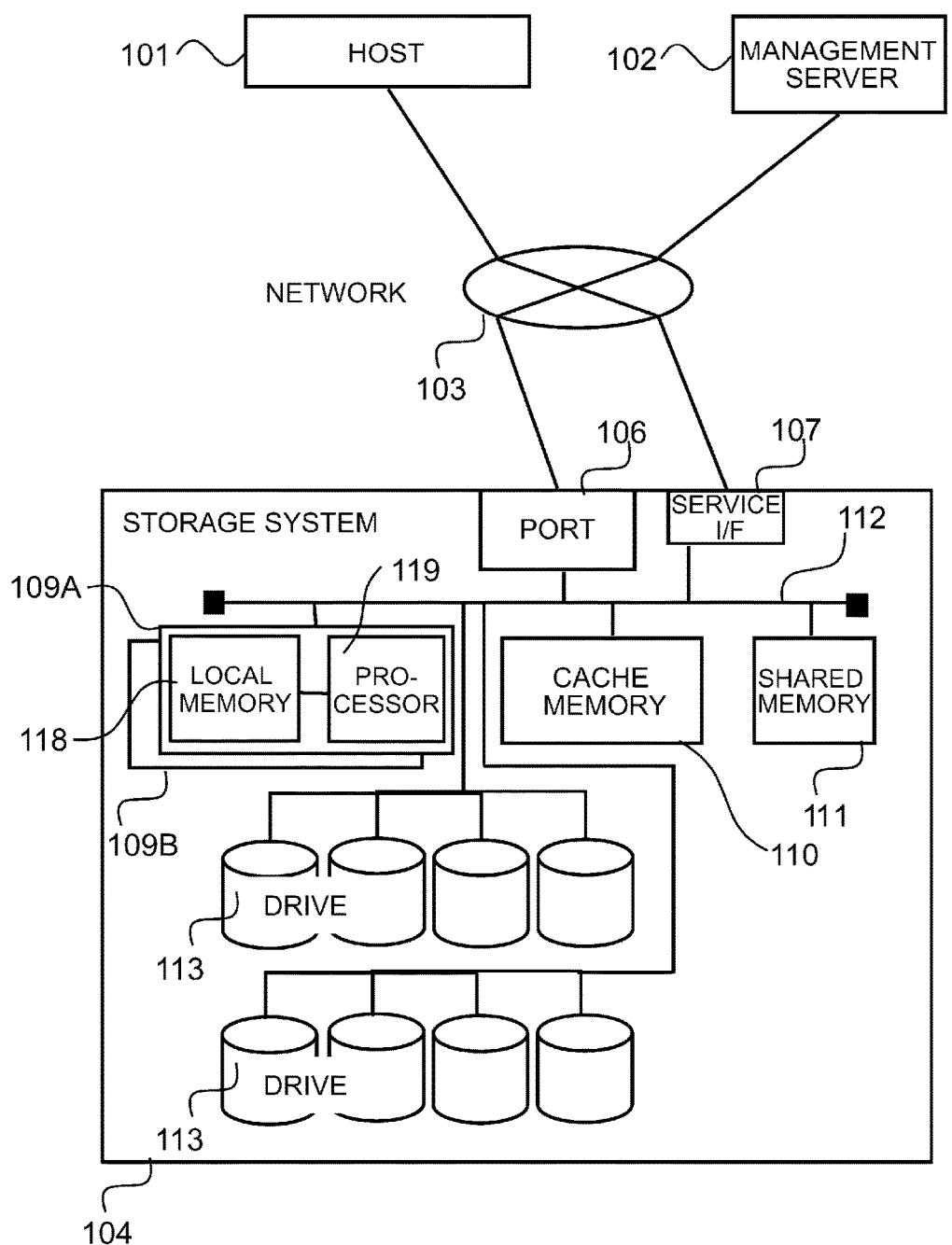
FIG. 1 is a constitutional view of a computer system according to a first example of the present invention.

FIG. 1 is a constitutional view of the computer system according to the first example of the present invention.

In FIG. 1, the computer system is configured from a host 101, a management server 102, a network 103, and a storage system 104. The storage system 104 is configured from a port 106, a service I/F (Interface) 107, a plurality of processor packages 109A, 109B, a cache memory 110, a shared memory 111, and a plurality of drives 113.

The host 101 is a computer device which comprises information processing resources such as a CPU (Central Processing Unit), a memory, and an I/O interface, and is configured as a personal computer, work station, or mainframe or the like, and connected to the port 106 of the storage system 104 via the network 103, for example. The host 101 issues a data read command or write command to the storage system 104 and the storage system 104 executes data reading or writing in response to the read command or write command issued by the host 101.

In other words, the host 101 is able to access the logical volume by issuing an access command (access request) designating a logical volume which is provided by the storage system 104, such as a read command or write command to the storage system 104, for example.

The network 103 is configured by a SAN (Storage Area Network) or Ethernet, for example.

The management server 102 is configured by a computer device which comprises information processing resources such as a CPU, memory, I/O and interface, and is connected to the service I/F 107 or port 106 of the storage system 104 via the network 103. The management server 102 transmits a command for managing the required various configuration information to the storage system 104 after operating the storage system 104 on the basis of the operation of the system administrator.

The internal configuration of the storage system 104 will be described next.

The storage system 104 is configured from the port 106, the service I/F 107, the plurality of processor packages 109A, 109B, the cache memory 110, the shared memory 111, and the plurality of drives 113, which are interconnected via an internal network 112, and the port 106 and service I/F 107 are connected to the network 103. The processor packages 109A, 109B each house a local memory 118 and a processor 119.

The processor 119 is a processor which integrally controls the whole storage system 104, and executes data transfer processing between the drives 113 and the cache memory 110 in order to process read commands and write commands from the host 101.

The local memory 118 is memory which stores information with which the processor 119 processes read commands or write commands and stores required control information after executing the functions of the storage system 104, and is an area which can be occupied and used by the processor 119. The local memory 118 stores various programs and so on which are executed by the processor 119, for example.

In order to improve the throughput and response of the I/O processing of the storage system 104, the cache memory 110 is a memory for storing data as temporary cache data and is capable of high-speed access.

The shared memory 111 is memory which stores information enabling the processor 119 to process read commands and write commands and which stores the required control information after executing the functions of the storage system 104 (volume copy function and the like, for example). The shared memory 111 also stores information which is shared between the processors 119 of the plurality of processor packages 109A and 109B. Although the shared memory 111 appears in the drawings as a separate memory from the cache memory 110, part of the area of the cache memory 110 may also be used as the shared memory 111.

The drives 113 are each storage devices which comprise an interface such as an FC (Fibre Channel), SAS (Serial Attached SCSI), or SATA (Serial Advanced Technology Attachment) interface, for example, and are each configured from hard disk drives (HDD) or SSDs (Solid State Drive) or the like.

Storage devices include, for example, hard disk devices, semiconductor memory devices, optical disk devices, magneto-optical disk devices, magnetic tape devices, and flexible disk devices and the like, and these storage devices are devices capable of reading/writing data.

Furthermore, RAID (Redundant Array of Inexpensive Disks) groups, such as, for example, RAID4, RAID5, and RAID6 and the like, are constituted by each of the drives 113 and each of the drives 113 can also be divided into a plurality of RAID groups. Here, a plurality of logical volumes can also be formed in a physical storage area of each drive 113.

Logical volumes are logical units provided in the host 101 as access targets of the host 101 and may be broadly categorized as normal volumes and virtual volumes.

Normal volumes are configured from logical storage areas formed in the drives 113. The virtual volumes, however, are provided by a Thin Provisioning function and are configured from storage area units called pages. At the stage before initial data for creating the virtual volumes is written, logical storage areas which are formed from physical storage areas are not associated with the pages. Further, if the pages are subjected to the writing of new data, some of the storage areas of the logical storage areas formed in the drives 113 are assigned to the pages that have undergone this writing and data is stored in these assigned storage areas.

A LUN (Logical Unit Number) is assigned as an identifier to the normal volumes and virtual volumes, and a logical block address LBA (Logical Block Address) is assigned to each of the segments. Here, the host 101 is able to access data stored in storage areas corresponding to normal volumes or virtual volumes by transmitting a logical address, comprising an identifier LUN and logical block address LBA, to the storage system 104.

Figure 2:
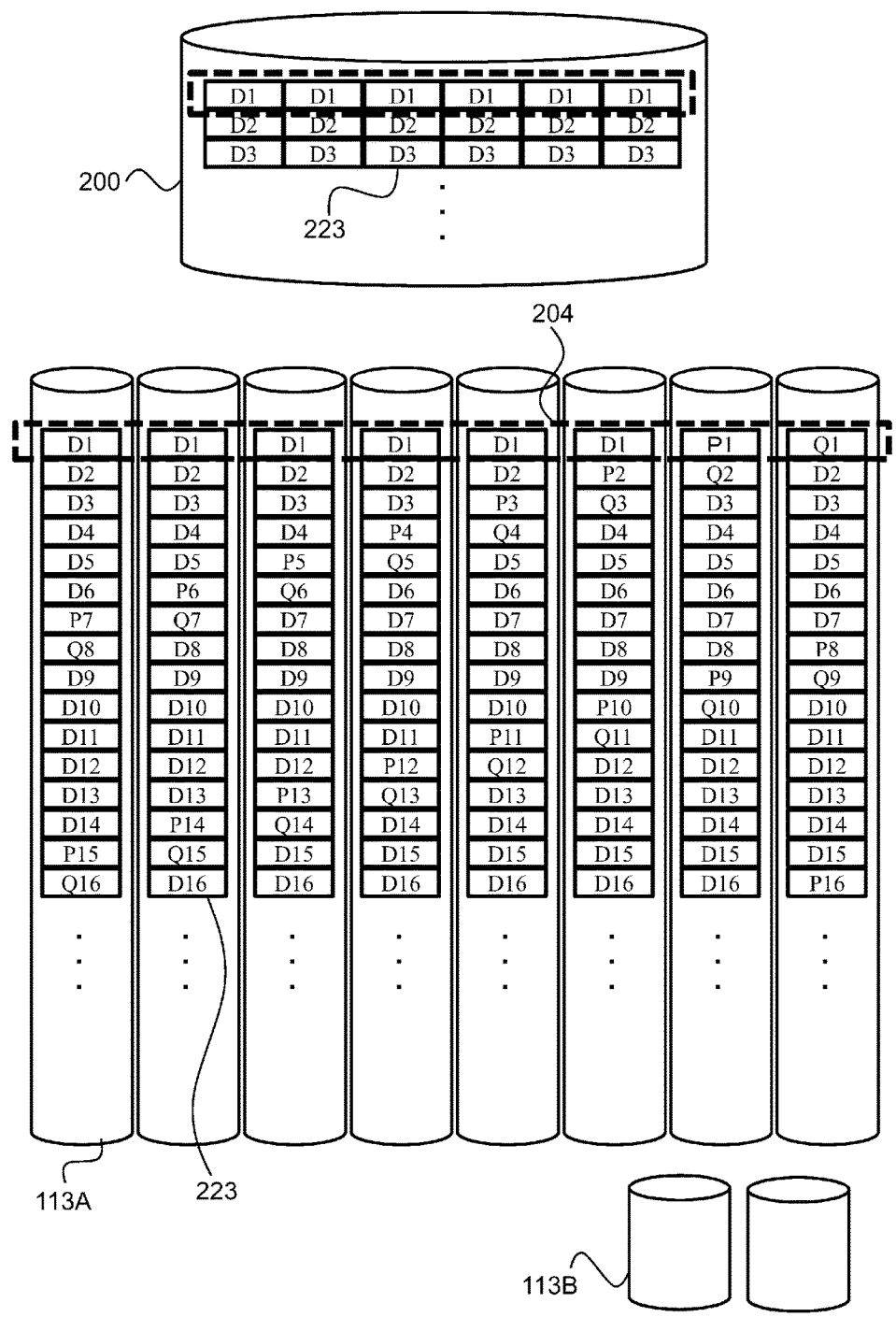
FIG. 2 is a logical constitutional view of a computer system according to the first example of the present invention.

FIG. 2 is a logical constitutional view of the computer system according to the first example of the present invention.

In FIG. 2, logical volume 200 represents a logical storage device which is accessed by the host 101. The host 101 carries out data reading and writing from/to designated storage areas by issuing a read command or write command to the logical volume 200. At this time, the storage area which is the substance of the logical volume 200 is configured by a plurality of drives 113A selected from among the plurality of drives 113. The data is stored in each drive 113A as a set of stripe data 223 of the stripe row 204 formed in the plurality of drives 113A.

In a case where RAID6 is formed by a plurality of drives 113A, a plurality of stripe rows 204 are formed by a plurality of data portions D1, D2, . . . , a P parity P1, P2, . . . , and a Q parity Q1, Q2. For example, a single stripe row 204 is formed using six data portions D1, a P parity P1, and a Q parity Q1, and a single stripe row 204 is formed using six data portions D2, a P parity P2, and a Q parity Q2. Among the plurality of data which form the single stripe row 204, one data item, for example the data portion D1, is managed as a single stripe data item 223, for example.

Spare drives 113B are drives which are used as data restoration destinations when the drives 113A fail.

Note that the configuration of the stripe row 204 is not limited to a case where a RAID6 is formed by a plurality of drives 113A. For example, the stripe row 204 need not be formed from eight drives 113A, rather, the stripe row 204 may be configured by using all the drives 113 installed in the storage system 104 or the stripe row 204 may be configured using some of the drives 113. The same is also true when a stripe row 204 is formed in the spare drives 113B.

Figure 3:
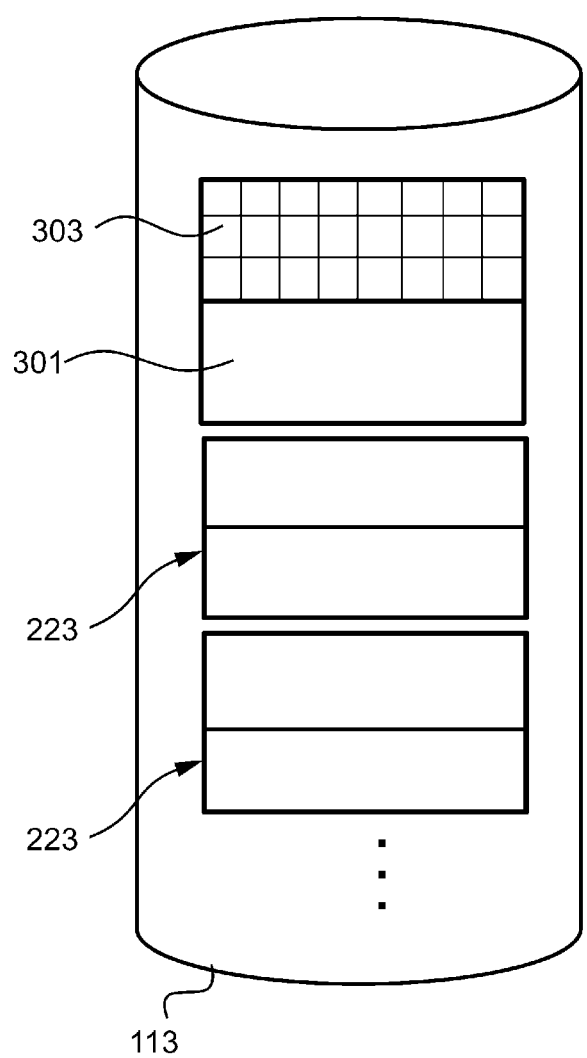
FIG. 3 is a constitutional view of storage areas of a computer system according to a first example of the present invention.

FIG. 3 is a constitutional view of storage areas of the computer system according to the first example of the present invention.

In FIG. 3, the stripe data 223 which is stored in each drive 113 is configured from a plurality of slots 301. Each slot 301 is configured from a plurality of subblocks 303. The data size of each subblock 303 is typically 512 bytes. The sub-blocks 303 are minimal units for drive access. Each slot 301 is configured by areas in which a plurality of subblocks 303 are managed, and are management units of the cache memory 110. That is, if data is transferred from the drives 113 to the cache memory 110, a data storage area (hereinafter may also be called a cache storage area) is reserved in the cache memory 110 in units of the size of slot 301 and data is transferred to the reserved data storage area.

Figure 4:
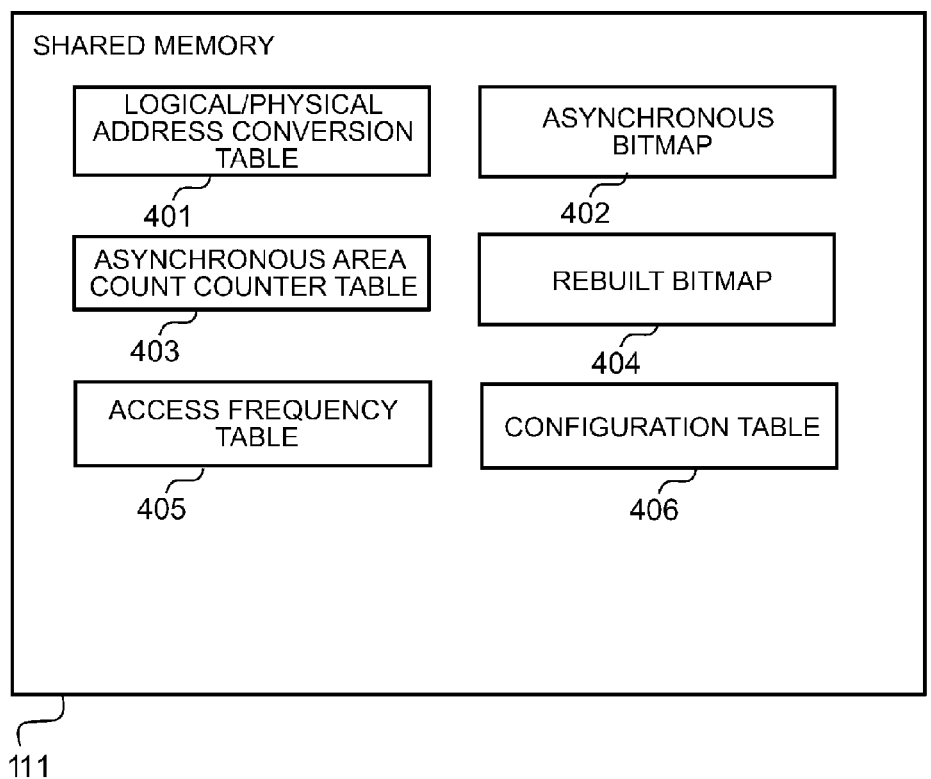
FIG. 4 is a constitutional view of a shared memory of a computer system according to a first example of the present invention.

FIG. 4 is a constitutional view of a shared memory of the computer system according to the first example of the present invention.

In FIG. 4, the shared memory 111 stores a logical/physical address conversion table 401, an asynchronous bitmap 402, an asynchronous area counter table 403, a rebuilt bitmap 404, an access frequency table 405, and a configuration table 406.

Note that the asynchronous bitmap 402 and the rebuilt bitmap 404 are managed as tables. Furthermore, the cache memory management table, described subsequently, can also be stored in the shared memory 111. These tables may be disposed in the shared memory 111 or some or all of the tables may be disposed in the cache memory 110, local memory 118, or drives 113.

Figure 5:
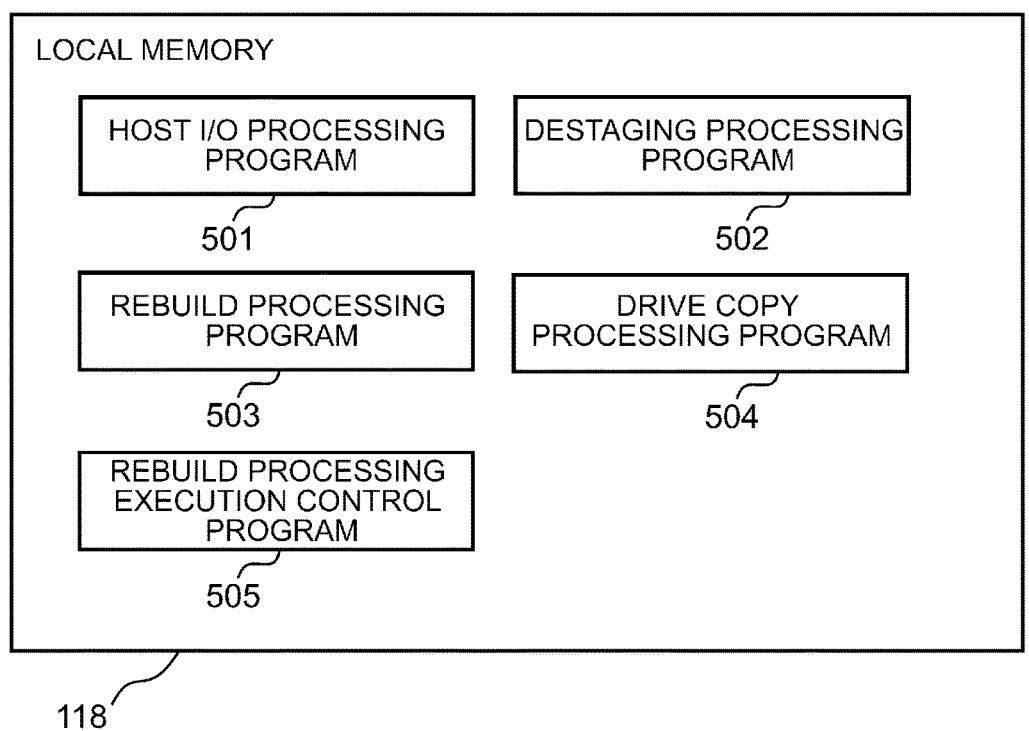
FIG. 5 is a constitutional view of a local memory of the computer system according to the first example of the present invention.

FIG. 5 is a constitutional view of the local memory in the computer system according to the first example of the present invention.

In FIG. 5, the local memory 118 stores a host I/O processing program 501, a destaging processing program 502, a rebuild processing program 503, and a drive copy processing program 504. These programs are executed by the processor 119. These programs may be disposed in the shared memory 111 or some or all of the programs may be disposed in the cache memory 110, local memory 118, or drives 113.

FIG. 6 is a constitutional view of a logical/physical address conversion table of the computer system according to the first example of the present invention.

In FIG. 6, the logical/physical address conversion table 401 is a table for managing the relationships between the plurality of logical volumes and the drives 113 forming each of the logical volumes, and is stored in the shared memory 111.

The logical/physical address conversion table 401 is configured from a logical volume number field 601, a type field 602, a physical drive number field 603, a physical start address field 604, and a drive state field 605.

The logical volume number is an identifier for uniquely identifying each of the logical volumes. Each entry of the logical volume number field 601 stores an identifier for uniquely identifying each logical volume. For example, as identifiers for identifying two logical volumes, 201 is stored in the first entry and 202 is stored in the second entry.

The type is information indicating the RAID level of each logical volume. Each entry of the type field 602 stores RAID6, for example, as the RAID level of each logical volume.

The physical drive number is an identifier for uniquely identifying the drives 113 forming each logical volume. Each entry of the physical drive number field 603 stores an identifier for uniquely identifying drives 113 forming each logical volume. For example, if the logical volume 200 (logical volume with the logical volume number 201) is configured from eight drives 113 and the physical drive numbers of each of the drives 113 are 1001 to 1008, the first entry of the physical drive number field 603 stores 1001 to 1008 as the identifiers of the drives forming the logical volume 200.

The physical start address is information indicating the start position of the address of the drive 113 forming each of the logical volumes. Each of the entries of the physical start address field 604 stores 0x0000, for example, as the address indicating the start position of the address of each drive 113.

The drive state is information indicating the state of each drive 113. Each entry in the drive state field 605 stores, as information indicating the state of each drive 113, "normal" in a case where the drive 113 is in the normal state, and "failed" if the drive 113 has failed, for example.

For example, the processor 119 transfers data between the drives 113 and the cache memory 110 during I/O processing and if an error arises in the data transfer or if the data transfer is taking time and times out, the processor 119 determines that the drive 113 targeted in the data transfer has failed and stores "failed" in the entry of the drive state field 605 corresponding to the drive 113 determined to have failed.

Furthermore, if the storage area of the drive 113 is diagnosed at regular intervals using a Verify command or similar, the processor 119 determines that the drive 113 being diagnosed has failed from the diagnosis result and store "failed" in the entry of the drive state field 605 corresponding to the drive 113 determined to have failed.

Figures 7, 8:
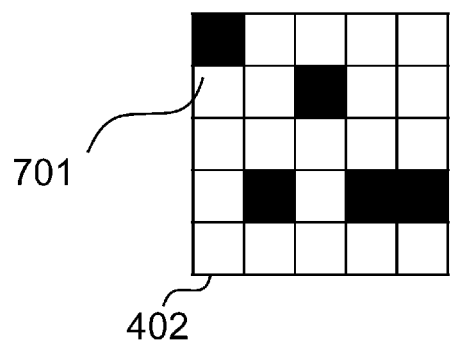
FIG. 7 is a constitutional view of an asynchronous bitmap of the computer system according to the first example of the present invention.
FIG. 8 is a constitutional view of an asynchronous area counter table of the computer system according to the first example of the present invention.

FIG. 7 is a constitutional view of the asynchronous bitmap of the computer system according to the first example of the present invention.

In FIG. 7, the asynchronous bitmap 402 of the computer system is a table which is held for each logical volume 200 and is a table for managing whether redundant data is created among the stripe data 223 belonging to the stripe rows 204 of the logical volume 200.

A single bit 701 is managed as an update bit and corresponds to a single stripe row 204 in the logical volume 200. If, for example, twenty-five stripe rows 204 are configured in the logical volume 200, the asynchronous bitmap 402 corresponding to the logical volume 200 is configured from twenty-five bits 701.

If bit 701 is ON=1 in the asynchronous bitmap 402, the redundant data, for example, Q parity in the stripe row 204 which corresponds to this bit 701 has been created asynchronously to the I/O processing by the processor 119 (hereinafter processing which is executed by the processor 119 asynchronously to the I/O processing will sometimes be called asynchronous processing). In this case, this indicates that the redundant data is in an old state.

If, however, the bit 701 is OFF=0, the redundant data of the stripe row 204 corresponding to the bit 701 is created by the processor 119 in sync with the I/O processing (hereinafter, the processing which is executed by the processor 119 in sync with the I/O processing may also be referred to as synchronous processing). In this case, this indicates that the redundant data is in the latest state.

FIG. 8 is a constitutional view of an asynchronous area counter table of the computer system according to the first example of the present invention.

The asynchronous area counter table 403 is a table for managing the number of bits 701 in the asynchronous bitmap 402 corresponding to each logical volume 200 which are ON (number of updated bits). The asynchronous area counter table 403 is configured from a logical volume number field 801 and an asynchronous area counter field 802.

The logical volume number is an identifier for uniquely identifying each of the logical volumes 200. Each entry in the logical volume number field 801 stores, as identifiers for uniquely identifying each of the logical volumes 200, stores 201, 202, and 203, for example.

The asynchronous area count counter is information indicating the number of bits 701 in the asynchronous bitmap 402 corresponding to each logical volume 200 which are ON. Each entry in the asynchronous area counter field 802 stores the number of bits 701 in the asynchronous bitmap 402 corresponding to each logical volume 200 which are ON. For example, if the number of bits 701 in the asynchronous bitmap 402 corresponding to the logical volume 200 with the logical volume number 201 which are ON is 100, 100 is stored in the entry in the asynchronous area counter field 802 which corresponds to the logical volume number 201.

Figures 9, 10:
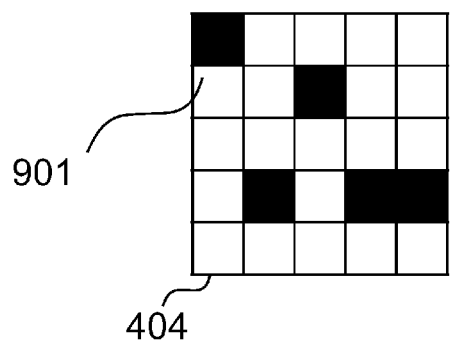
FIG. 9 is a constitutional view of a rebuilt bitmap of the computer system according to the first example of the present invention.
FIG. 10 is a constitutional view of an access frequency table of the computer system according to the first example of the present invention.

FIG. 9 is a constitutional view of the rebuilt bitmap of the computer system according to the first example of the present invention.

In FIG. 9, the rebuilt bitmap 404 is a table which is held in the logical volume 200 and is a table for managing whether, among the drives 113 assigned to the stripe row 204 of the logical volume 200, stripe data 223 which is stored in the failed drive 113 has been rebuilt (repaired).

The rebuilt bitmap 404 is configured from a plurality of bits 901 and a single bit 901 corresponds to a single stripe row 204 in the logical volume 200. If twenty-five stripe rows are configured, for example, in the logical volume 200, the rebuilt bitmap 404 which corresponds to the logical volume 200 is configured from twenty-five bits 901.

In the rebuilt bitmap 404, if the bit 901 is ON=1, this indicates that the stripe data 223 which corresponds to the failed drive 113 in the stripe row 204 is rebuilt and the that the data has been repaired.

If, on the other hand, the bit 901 is OFF=0, this indicates that the stripe data 223 corresponding to the failed drive 113 in the stripe row 204 has not been rebuilt and the data has not been repaired.

The rebuilt bitmap 404 is held by all the logical volumes 200 including the failed drive 113. At this time, all the logical volumes 200 may be pre-configured to hold the rebuilt bitmap 404, and when the drive 113 in the logical volume 200 fails due to a reduction in the capacity of the shared memory 111, a rebuilt bitmap 404 may be dynamically assigned to the logical volume 200 corresponding to the failed drive 113. Further, the rebuilt bitmap 404 is initialized with an initial value OFF=0 when a series of rebuild processes is started after drive failure occurs.

FIG. 10 is a constitutional view of the access frequency table of the computer system according to the first example of the present invention.

In FIG. 10, the access frequency table 405 is a table for managing the frequency of access to each logical volume 200 and is configured from a logical volume number field 1001, an area address field 1002, and an access frequency counter field 1003.

The logical volume number is an identifier for uniquely identifying each logical volume 200. Each entry in the logical volume number field 1001 stores 201 and 202, for example, as identifiers for uniquely identifying each logical volume 200.

The area address is information indicating the address of a small area in each logical volume 200. Each entry of the area address field 1002 stores the address of a small area in each logical volume 200. If, for example, a plurality of small areas exist in the logical volume 200 of the logical volume number 201, 0x00000000, 0x00000010, and 0x00000020 . . . are stored as addresses corresponding to each small area.

Note that small area addresses may, for example, be addresses which correspond to a single stripe row 204 in the logical volume 200, may have a lower granularity (for example, stripe data 203 units, slot 301 units, or subblock 303 units) or a higher granularity (page units which are a plurality of stripe rows 204 or one or more virtual volumes).

The access frequency counter is information indicating the frequency of access to the small areas in each logical volume 200. Each entry in the access frequency counter field 1003 stores the frequency of access to the small areas in each logical volume 200. For example, if the frequency of I/O access by the host 101, which is the access frequency to the small areas in the logical volume 200 with the logical volume number 201, is 10, 10 is stored in the entry in the access frequency counter field 1003 corresponding to the small area in the logical volume 200 with the logical volume number 201.

Note that the access frequency counter may be the number of I/O by the processor 119 to the drives 113 or may be the number of I/O accesses by the host 101 (including the number of accesses if there is no access to the drives 113 by the bits to the cache memory 110).

FIG. 11 is a constitutional view of the configuration table of the computer system according to the first example of the present invention.

In FIG. 11, the configuration table 406 is held for each logical volume 200 and is a table for managing the configuration items and configuration content which are configured for each logical volume 200. The configuration table 406 is configured from a logical volume number field 1101, a configuration item field 1102, and a configuration content field 1103.

The logical volume number is an identifier for uniquely identifying each logical volume 200. Each entry in the logical volume number field 1101 stores 201 or 202, for example, as identifiers for uniquely identifying each of the logical volumes 200.

The configuration items are information indicating the configuration items which are configured for each logical volume 200. Each entry in the configuration item field 1102 stores information indicating the configuration items configured in each logical volume 200 such as, for example, "rebuild operation mode," "asynchronous redundant data generation mode," and "allowed desynchronization capacity."

The "rebuild operation mode" is an item for configuring the speed of the rebuild operation (operation for restoring the data redundancy). The "asynchronous redundant data generation mode" is an item for selecting whether the generation of redundant data should not be carried out in order to obtain the effect of the present invention using the logical volume 200. The "allowed desynchronization capacity" is an item for configuring the capacity which is allowed as the capacity of the stripe row 204 targeted by the asynchronous processing.

The configuration content is information specifying the content of the configuration item. Each entry in the configuration content field 1103 stores information specifying the content of the configuration item. For example, "High Speed" or "Normal" is stored in the entry in the configuration content field 1103 corresponding to "rebuild operation mode." If "High Speed" is stored in the entry in the configuration content field 1103, this means that an operation prioritizing rebuild processing over the host I/O is to be executed and the rebuild time is to be shortened. Note that the prioritization method will be described subsequently.

In a case where "Normal" is stored in the entry of the configuration content field 1103, this signifies that an operation prioritizing the host I/O and minimizing the effect on the rebuild processing is executed.

Further, the entry in the configuration content field 1103 corresponding to the "asynchronous redundant data generation mode" stores "ON" if redundant data generation is not carried out and "OFF" if redundant data generation is executed.

Furthermore, the entry in the configuration content field 1103 which corresponds to the "allowed desynchronization capacity" is the capacity allowed as the capacity of the stripe row 204 targeted by the asynchronous processing and stores the maximum number of stripe rows 204 which are processed asynchronously, for example 1000.

Figure 12:
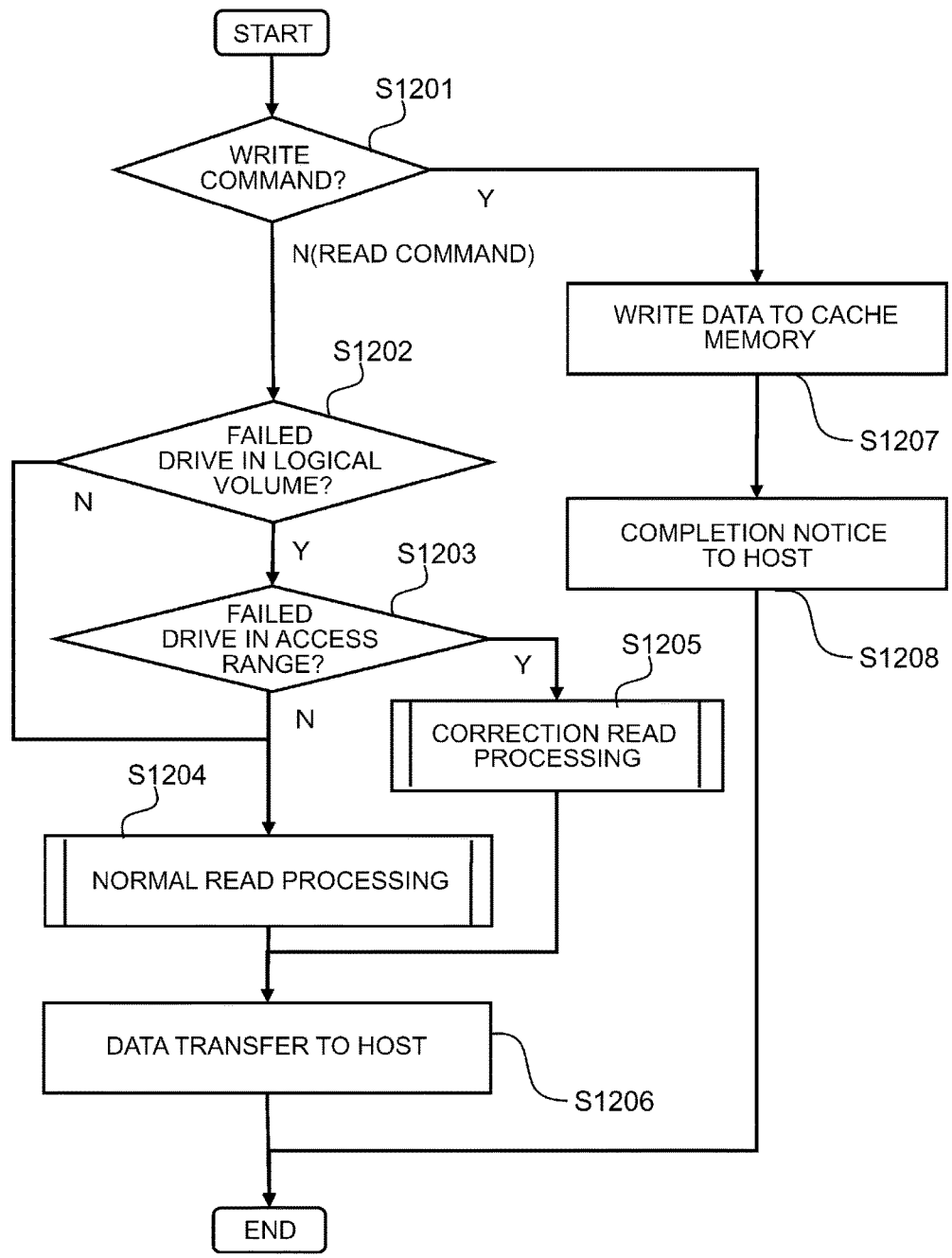
FIG. 12 is a flowchart serving to illustrate the processing of an I/O processing program of the computer system according to the first example of the present invention.

FIG. 12 is a flowchart serving to illustrate the processing of an I/O processing program of the computer system according to the first example of the present invention.

When the processor 119 in the storage system 104 receives an I/O processing request from the host 101, the processor 119 starts up the host I/O processing program 501 in the storage system 104.

The host I/O processing program 501 determines whether the request is a data read request to read from the logical volume 200 or a data write request to write to the logical volume 200 (S1201).

If the I/O processing request is a write request, the host I/O processing program 501 checks whether an area (hereinafter sometimes referred to as a cache memory area)

corresponding to an address in the logical volume which corresponds to the I/O processing request has been reserved in the cache memory 110, and if a cache memory area has been reserved or must be reserved, the host I/O processing program 501 reserves the cache memory area in the cache memory 110 and then responds to the host 101 that write data can be transferred.

The host I/O processing program 501 subsequently writes write data which has been transferred from the host 101 in the reserved cache memory area, and erects a dirty flag in the cache memory management table (not shown) as an area in which write data has not yet been written to the drive 113 (S1207).

Here, a dirty flag is information indicating states where there is data only in the cache memory 110 or where there is no data in the drive 113, and is held in the cache memory management table for managing areas of the cache memory 110. The destaging processing program 502, which will be described subsequently, references [the table] to check whether the dirty flag has been erected, and if the dirty flag has been erected, the destaging processing program 502 executes destaging processing for writing data located in the cache memory 110 to the drive 113.

After the data in the area for which the dirty flag is erected in the cache memory management table has been written to the drive 113, the dirty flag is deleted from the cache memory management table. Note that, when the data read from the drive 113 is stored in the cache memory 110 during reading, a clean flag is erected in the cache memory management table.

As mentioned earlier, the cache memory management table is able to hold and manage at least the address of the logical volume 200 corresponding to the address of the cache memory 110 and data which exists in the cache memory 110. Furthermore, the address of the logical volume 200 corresponding to the address of the cache memory 110 is held in the cache memory management table as an effective value only if a cache memory area has been reserved in the cache memory 110 in order to store data in the logical volume 200.

Further, after executing the processing of step S1207, the host I/O processing program 501 issues a response to the effect that write I/O processing is complete to the host 101 (S1208). Thereafter, the host I/O processing program 501 terminates the processing of this routine.

If, however, it is determined in step S1201 that the I/O processing request is a read request, the host I/O processing program 501 confirms that there is a failed drive 113 in the logical volume 200 requested by the read request (S1202).

More specifically, the host I/O processing program 501 refers to the drive state field 605 in the logical/physical address conversion table 401 and checks whether there is a "failed" drive 113 in the drives 113 corresponding to the logical volume 200.

If an affirmative determination result is obtained in the step S1202, that is, if there is a failed drive 113 in the logical volume 200 requested by the read request, the host I/O processing program 501 checks whether or not there is a failed drive 113 in the access range (S1203).

More specifically, because the access range is determined by the LBA (Logical Block Addressing) contained in the read request from the host 101, the host I/O processing program 501 seeks, from the LBA contained in the read request, the access destination stripe row 204 and determines whether or not stripe data 223 for the failed drive 113 is contained in the retrieved stripe row 204 by checking the drive state field 605 in the logical/physical address conversion table 401.

If an affirmative determination result is obtained in step S1203, that is, if there is a failed drive 113 in the access range, the host I/O processing program 501 executes correction read processing (S1205). The correction processing is processing for reading recovered data while the data is being recovered, and the details will be provided subsequently.

If a negative determination is obtained in step S1203, that is, if there is no failed drive 113 in the access range, or if there is a negative determination result in step S1202 or, in other words, if there is no failed drive 113 in the logical volume 200 requested by the read request, the host I/O processing program 501 executes normal read processing (S1204).

Normal read processing is processing in which, if the data to be read is not in the cache memory 110 (cache miss), data is transferred to the cache memory 110 from the drive 113, the details of which will be provided subsequently.

If normal read processing or correction read processing ends, the host I/O processing program 501 transfers the data in the cache memory 110 to the host 101 (S1206).

After all the data requested by the host 101 has been transferred to the host 101, the host I/O processing program 501 transfers a read processing completion response to the host 101 and terminates the processing of this routine.

Figure 13:
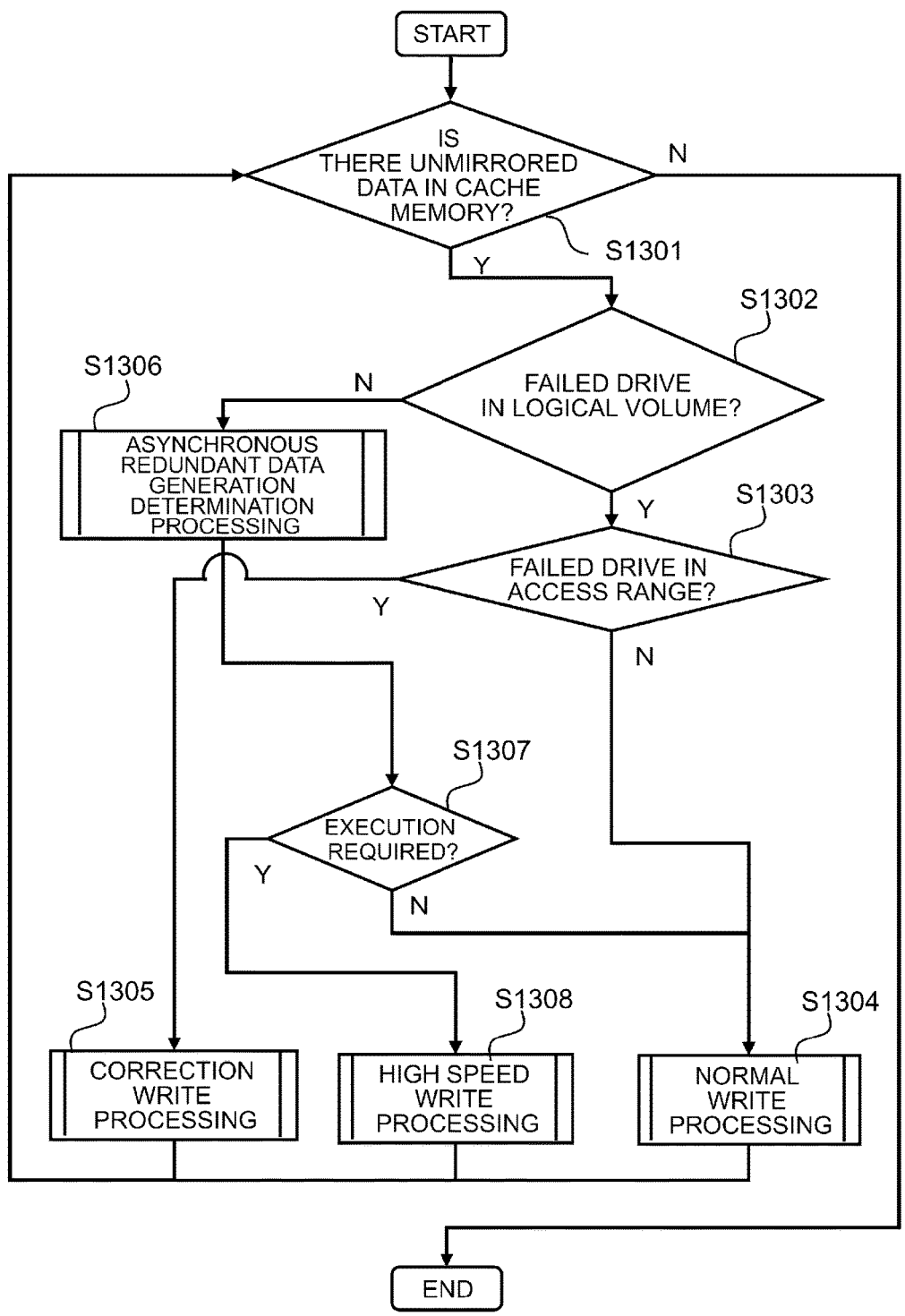
FIG. 13 is a flowchart serving to illustrate the processing of a destaging processing program.

FIG. 13 is a flowchart for explaining a destaging processing program.

The host I/O processing program 501 erects a dirty flag in the cache memory management table after writing the write data from the host 101 to the cache memory 110 in response to a data write request from the host 101. Hence, the processor 119 starts up the destaging processing program 502 at regular intervals in order to write the write data that exists in the cache memory 110 to the drive 113 at regular intervals.

The destaging processing program 502 refers to the cache memory management table and determines whether dirty data (data for which a dirty flag has been erected but which has not been written to the drive 113) has been written to the cache area of the cache memory 110 (S1301).

In a case where an affirmative determination result is obtained in step S1301, that is, where dirty data exists in the cache memory 110, the destaging processing program 502 determines whether or not there is a failed drive 113 in the logical volume 200 based on the logical address with a logical volume number registered in the cache management table (S1302). Here, the destaging processing program 502 executes the same processing as step S1202 in FIG. 12.

If an affirmative determination result is obtained in step S1302, that is, if there is a failed drive 113 in the logical volume 200, the destaging processing program 502 determines whether or not there is a failed drive 113 in the access range (S1303).

Here, the destaging processing program 502 executes the same processing as step S1203 in FIG. 12.

If an affirmative determination result is obtained in step S1203, that is, if there is a failed drive 113 in the access range, the destaging processing program 502 performs correction write processing (S1305). Correction write processing is write processing in which writing is to an area including the failed drive 113, the details of which will subsequently be provided.

After performing correction write processing, the destaging processing program 502 returns once again to step S1301 and performs processing for determining whether dirty data exists.

If, however, a negative determination result is obtained in step S1303, that is, if there is no failed drive 113 in the access range, the destaging processing program 502 performs normal write processing (S1304). Details of the normal write processing will subsequently be provided.

After performing normal write processing, the destaging processing program 502 returns once again to S1301 and performs processing to determine whether dirty data exists.

Furthermore, if a negative determination result is obtained in step S1302, that is, if there is no failed drive 113 in the logical volume 200, the destaging processing program 502 performs asynchronous redundant data generation determination processing (S1306). The details of the asynchronous redundant data generation determination processing will subsequently be provided.

After performing the asynchronous redundant data generation determination processing, the destaging processing program 502 determines whether it is necessary to perform asynchronous redundant data generation determination processing (S1307).

If an affirmative determination result is obtained in step S1307, that is, if asynchronous redundant data generation determination processing needs to be performed, the destaging processing program 502 performs high speed write processing (S1308). High-speed write processing is processing in which write processing with a low drive load is realized without generating redundant data, and will subsequently be described in detail.

After performing the high-speed write processing, the destaging processing program 502 returns once again to S1301 and carries out processing to determine whether dirty data exists.

If, however, a negative determination result is obtained in step S1307, that is, asynchronous redundant data generation determination processing, the destaging processing program 502 performs normal write processing (S1304).

After performing normal write processing, the destaging processing program 502 returns once again to S1301 and performs processing to determine whether dirty data exists.

Furthermore, if a negative determination result is obtained in S1301, that is, if dirty data does not exist in cache memory 110, the destaging processing program 502 ends the processing of this routine.

Figure 14:
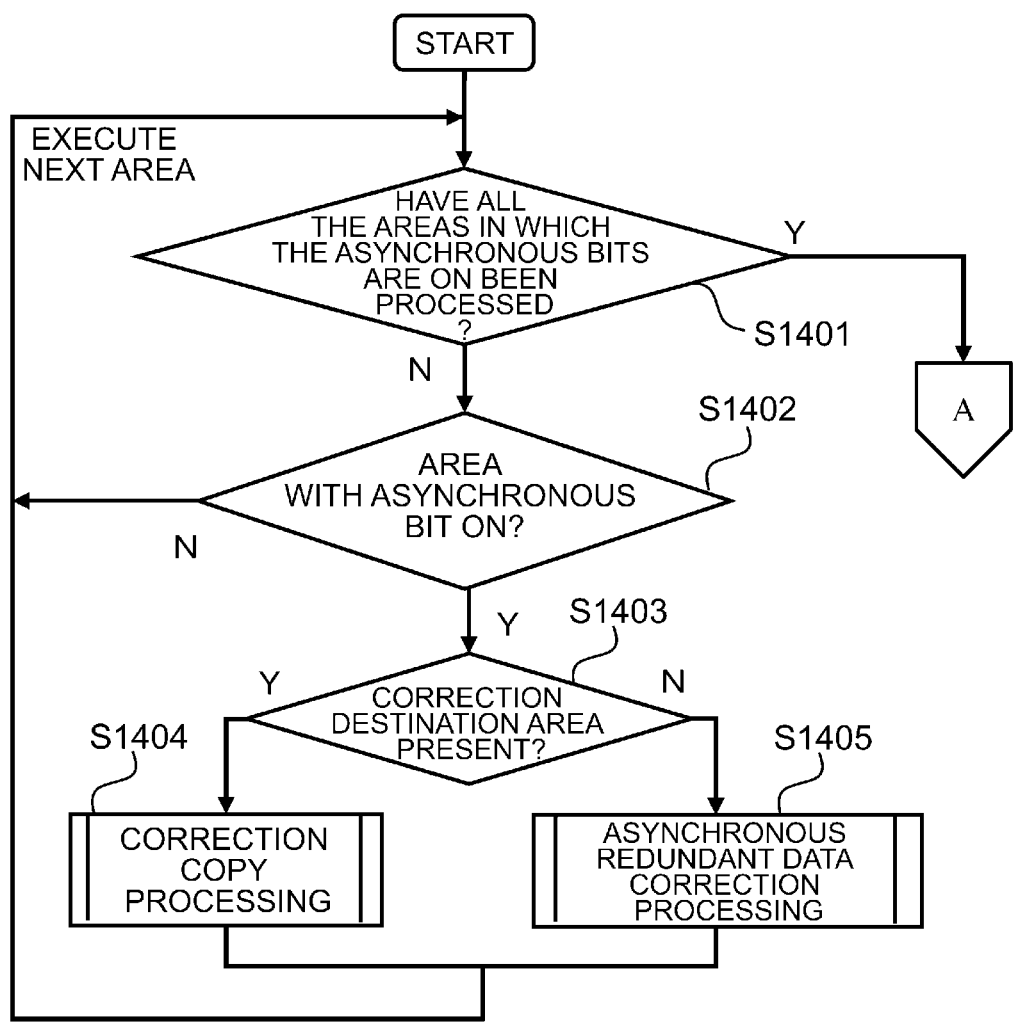
FIG. 14 is a flowchart serving to illustrate the processing of a rebuild processing program.

FIG. 14 is a flowchart for describing the processing of a rebuild processing program.

This processing is activated as a result of the processor 119 starting up the rebuild processing program 503 periodically when the drive 113 fails or at regular intervals.

The rebuild processing program 503 first determines whether or not ON areas have been processed in all the asynchronous bitmaps 402 (S1401). More specifically, the rebuild processing program 503 sequentially checks the stripe rows 204 of all the logical volumes 200 in steps S1401 and S1402 and it is assumed that all the check processing is complete.

As to the specifics of this processing, the rebuild processing program 503 determines whether all the bits 701 of the asynchronous bitmap 402 are OFF (S1402), and if, ultimately, all the entries in the asynchronous area counter field 802 of the asynchronous area counter table 403 are zero, the processing is complete and may be terminated.

If an affirmative result is obtained in step S1401, that is, if the ON areas of all the asynchronous bitmaps 402 have been processed, the rebuild processing program 503 advances to processing A. The details of processing A will be provided in FIG. 15.

If a negative determination result is obtained in step S1401, that is, if the ON areas of all the asynchronous bitmaps 402 have not been processed, the rebuild processing program 503 advances to the next processing for the unprocessed areas.

More specifically, the rebuild processing program 503 determines whether or not areas in which asynchronous bits are ON exist in the asynchronous bitmap 402 (S1402), and if a negative determination result is obtained in step S1402, the rebuild processing program 503 returns to the processing in step S1401, and if an affirmative determination result is obtained in step S1402, that is, if areas in which asynchronous bits are ON exist in the asynchronous bitmap 402, the rebuild processing program 503 determines whether or not there is a correction destination area (S1403).

If an affirmative determination result is obtained in step S1403, that is, if there is a correction destination area among unused spare drives 113B, the rebuild processing program 503 performs correction copy processing (S1404). The correction copy processing is processing to copy restored data to the correction destination area and will be described in detail subsequently.

Note that, if a failed drive 113 is physically replaced even when there is no unused spare drive 113B, the storage area of the replaced drive 113 can also serve as the correction destination area.

If an affirmative determination result is obtained in step S1403, that is, if there is no correction destination area in the unused spare drive 113B, the rebuild processing program 503 performs asynchronous redundant data correction processing (S1405). The asynchronous redundant data correction processing is processing in which redundant data is created for areas in which redundant data creation is desynchronized (hereinafter, processing which is asynchronous to host I/O will sometimes be referred to as desynchronization), and the details will be provided subsequently.

If correction copy processing (S1404) or asynchronous redundant data correction processing (S1405) is complete, the processing is started for the next area by returning to S1401.

Figure 15:
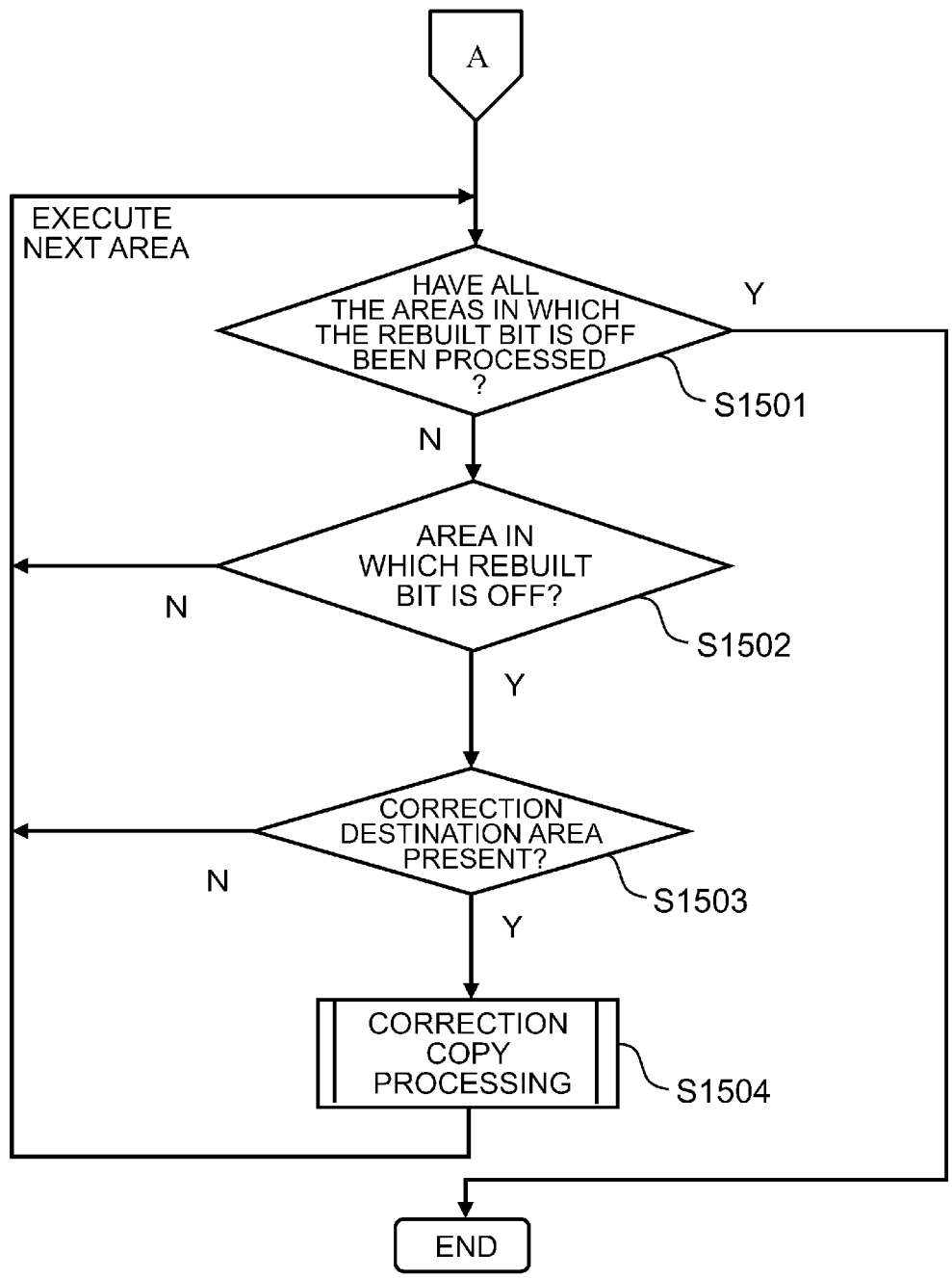
FIG. 15 is a flowchart serving to illustrate the processing of the rebuild processing program.

FIG. 15 is a flowchart to illustrate the processing of the rebuild processing program.

This processing is executed in a case where an affirmative determination result is obtained in step S1401 of FIG. 14.

The rebuild processing program 503 first determines whether or not areas in which all the rebuilt bits are OFF have been processed (S1501). Similarly to the afore-mentioned step S1401, in this determination processing, the rebuild processing program 503 sequentially checks the stripe rows 204 of all the logical volumes 200 in steps S1501 and S1502 and it is assumed that all the check processing is complete.

If an affirmative determination result is obtained in step S1501, that is, if all the areas in which rebuilt bitmaps 404 are OFF have been processed, the rebuild processing program 503 ends the processing in this routine.

If a negative determination result is obtained in step S1501, that is, if there are unprocessed areas in which all the rebuilt bitmaps 404 are OFF, the rebuild processing program 503 advances to the next processing for the unprocessed areas.

More specifically, the rebuild processing program 503 determines whether or not there are areas in which bits 901 are OFF in the rebuilt bitmap 404 (S1502), and if a negative determination result is obtained in step S1502, the rebuild processing program 503 returns to the processing of step S1501; if an affirmative determination result is obtained in step S1502, that is, if areas in which bits 901 are OFF exist in the rebuilt bitmap 404, the rebuild processing program 503 determines whether there is a correction destination area (S1503).

If an affirmative determination result is obtained in step S1503, that is, if there is a correction destination area, the rebuild processing program 503 executes correction copy processing (S1504) and subsequently starts processing for the next area by returning to step S1501.

In the processing of FIGS. 14 and 15 described hereinabove, when drive failure occurs, data restoration processing is first performed from the ON area of the asynchronous bitmap 402 and subsequently performed on other areas. This is because the redundancy of the asynchronous bitmap 402 is lower in the ON area than in the other areas, and therefore performing data restoration processing quickly on low redundancy areas yields the effect of improving the overall reliability.

Figure 16:
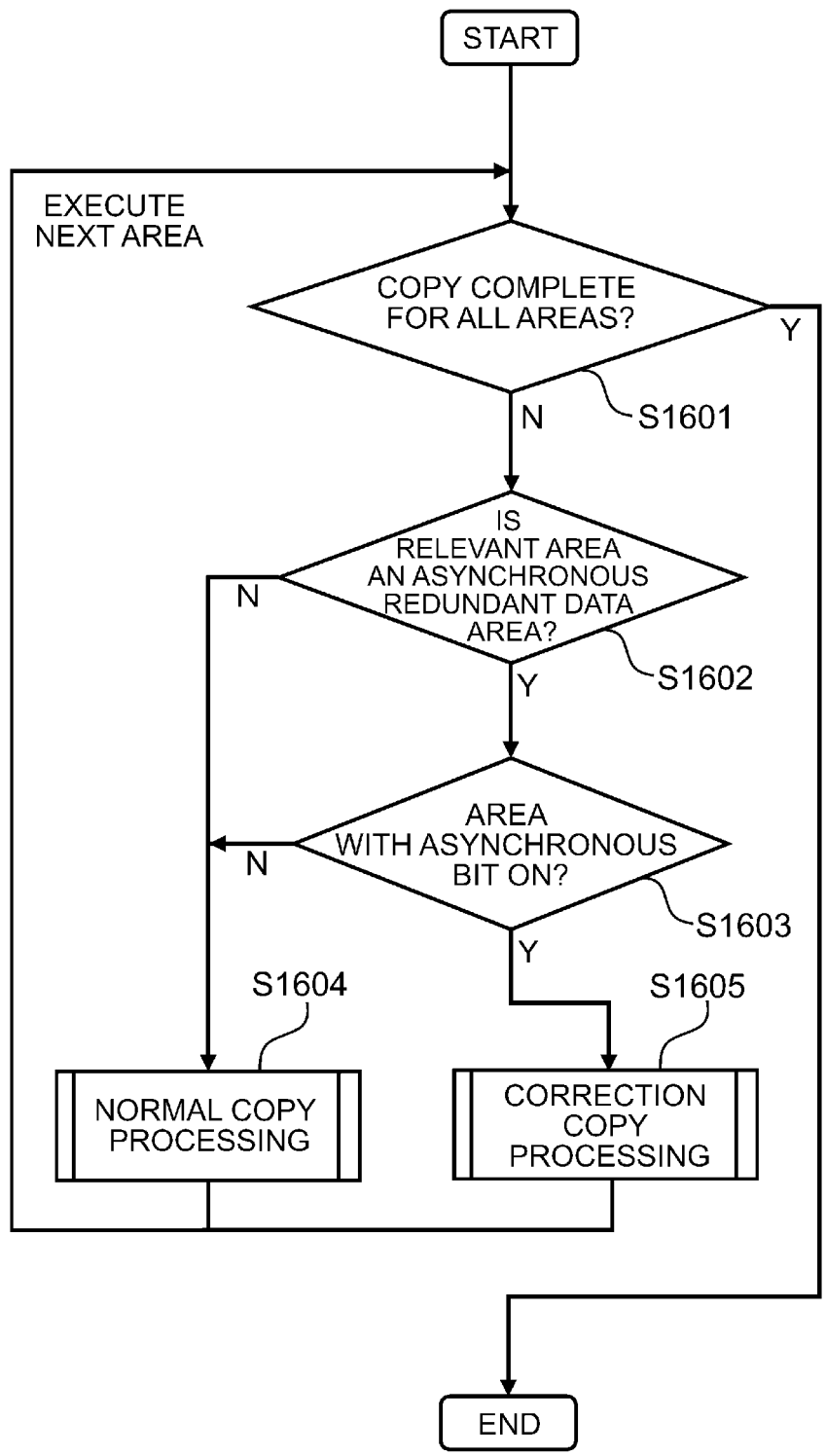
FIG. 16 is a flowchart serving to illustrate the processing of a drive copy processing program.

FIG. 16 is a flowchart serving to illustrate the processing of a drive copy processing program.

This processing is started by running the drive copy processing program 504 for copy processing to a spare drive 113B from a failed drive 113 in cases where the processor 119 pre-detects the signs of drive failure. Hereinafter, this advance copy processing will sometimes be called dynamic sparing.

Methods whereby the processor 119 pre-detects the signs of drive failure include a method which uses S.M.A.R.T. information, for example. Further, in addition to dynamic sparing, when data of a specified logical volume is copied to data of another logical volume, the processor 119 may also start up the drive copy processing program 504.

First, the drive copy processing program 504 determines whether copying is complete for all the areas of the logical volume 200 (S1601). Similarly to S1401 hereinabove, in this determination processing, the drive copy processing program 504 sequentially checks the stripe rows 204 of all the logical volumes 200 in steps S1601 and S1602 and it is assumed that all the check processing is complete. However, if there is no failed drive 113, the processing has been performed and ends.

Furthermore, in a case where some of the areas of the logical volume 200 are copied, the determination of whether copying is complete may also be made in S1601 for the stripe rows 204 in these areas.

If a negative determination result is obtained in step S1601, that is, if copying of all the areas of the logical volume 200 is incomplete, the drive copy processing program 504 advances the next processing for the uncopied areas.

The drive copy processing program 504 determines whether or not the areas for which copying is incomplete among the areas of the logical volume 200 are asynchronous redundant data areas (S1602).

More specifically, the drive copy processing program 504 determines that if the entry in the configuration content field 1103 corresponding to the asynchronous redundant data generation mode field 1102 is ON for each of the logical volumes 200 of the configuration table 406, the area for which copying is incomplete is an asynchronous redundant data area.

If an affirmative determination result is obtained in step S1602, that is, if there is an asynchronous redundant data area, the drive copy processing program 504 determines whether there is an area in which the asynchronous bit 701 is ON (S1603).

If an affirmative determination result is obtained in step S1603, that is, if there is an area in which the asynchronous bitmap 701 is ON, the drive copy processing program 504 performs correction copy processing (S1605) and subsequently executes processing for the next area by returning to step S1601.

If a negative determination result is obtained in step S1602, that is, if there is no asynchronous redundant data area or if a negative determination result is obtained in step S1603, that is, if there is no area in which the asynchronous bitmap 701 is ON, the drive copy processing program 504 executes normal copy processing (S1604) and then executes the processing for the next area by returning to S1601.

As described earlier for processing by the rebuild processing program 503, when drive failure occurs, if the processing of the drive copy processing program 504 described hereinabove first performs data restoration processing from the ON area of the asynchronous bitmap 402 and then carries out data restoration processing on the other areas, this yields the effect of improving the overall reliability.

Figure 17:
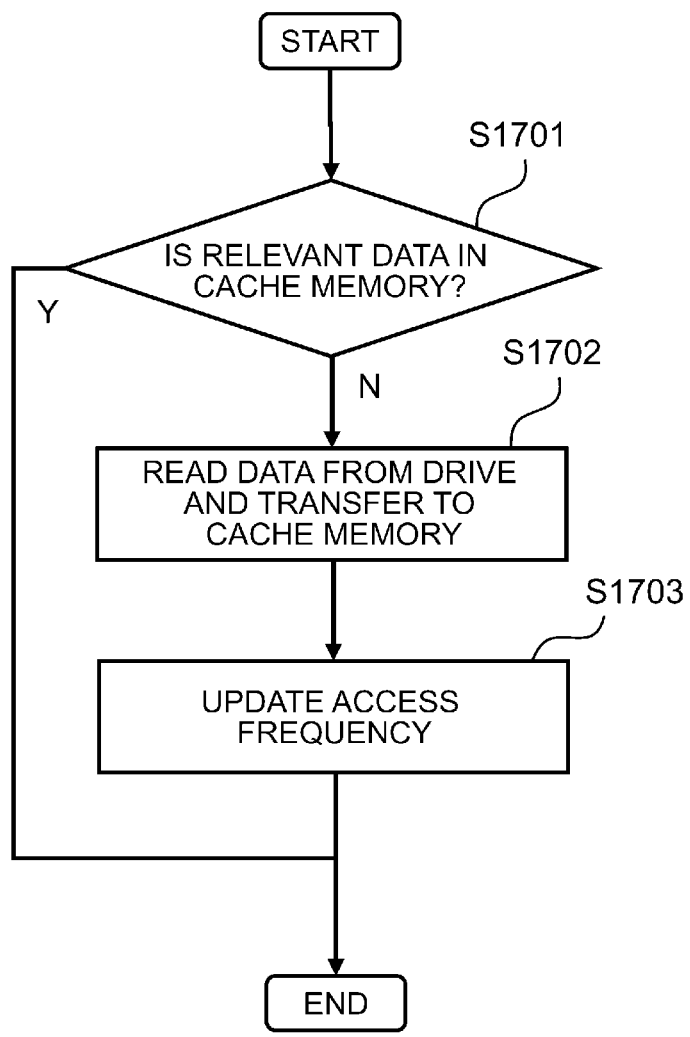
FIG. 17 is a flowchart serving to illustrate normal read processing which is a subprogram of a host I/O processing program.

FIG. 17 is a flowchart serving to illustrate normal read processing which is a subprogram of the host I/O processing program.

First, the host I/O processing program 501 refers to the cache memory management table and determines whether the data requested by a read command data (the relevant data) is present in the cache memory 110 (S1701).

If a negative determination result is obtained in step S1701, that is, if there is no relevant data in the cache memory 110, the host I/O processing program 501 reads data from the drive 113 and transfers the data to the cache memory 110 (S1702) and subsequently updates the access frequency table 405 (S1703).

More specifically, the host I/O processing program 501 increments the access frequency counter of the access frequency counter field 1003 which corresponds to the area address of the area address field 1002 in the access frequency table 405, by the number of times a command is issued to the drive 113.

If the access frequency table 405 is updated or an affirmative determination result is obtained in step S1701, the host I/O processing program 501 ends the processing of this routine.

Figure 18:
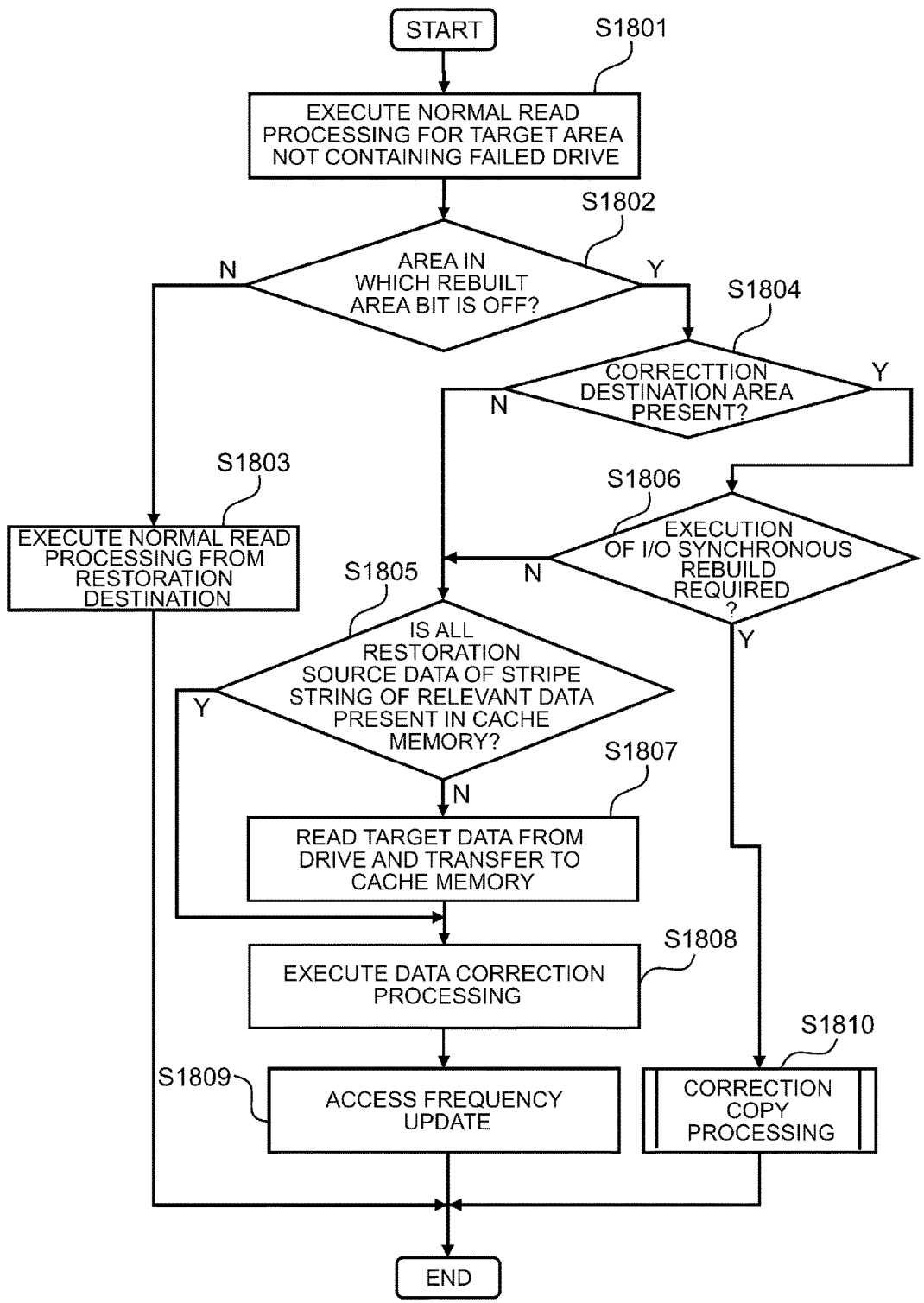
FIG. 18 is a flowchart serving to illustrate a correction read processing which is a subprogram of the host I/O processing program.

FIG. 18 is a flowchart serving to illustrate correction read processing which is a subprogram of the host I/O processing program.

First, the host I/O processing program 501 executes normal read processing for the read target areas which are not contained in the failed drives 113 among the read target areas (S1801).

More specifically, for one or more or some of the stripe rows 204 corresponding to the LBA contained in the read request from the host 101, the host I/O processing program 501 reads part of the stripe data 223 of the drives 113 other than the failed drives 113 among the drives 113 belonging to the stripe rows 204. The read processing is similar to normal read processing which is a subprogram of the host I/O processing program illustrated in FIG. 17.

Note that, even if not performed in step S1801, the read processing can be carried out in sync with the timing for read processing to another drive 113 in the course of the correction processing. In this case, the host 101 is able to delete the number of times a read command is issued.

The host I/O processing program 501 then determines whether or not the read target area is an area in which the rebuilt bit 901 is OFF (S1802).

More specifically, the host I/O processing program 501 determines whether or not the bit 901 in the rebuilt bitmap 404 which corresponds to the read target stripe row 224 is OFF.

If a negative determination result is obtained in step S1802, that is, if the bit 901 in the rebuilt bitmap 404 corresponding to the read-target stripe row 204 is ON, since data has already been restored to a restoration destination area of a spare drive 113B or the like, the host I/O processing program 501 executes read processing directly from the restoration destination area (S1803) and ends the processing of this routine.

This read processing is similar to the normal read processing which is a subprogram of the I/O processing program described in FIG. 17.

If an affirmative determination result is obtained in step S1802, that is, if the bit 901 of the rebuilt bitmap 404 corresponding to the read target stripe row 204 is OFF, the host I/O processing program 501 determines whether or not there is a correction destination area (S1804). In this determination processing, the host I/O processing program 501 determines, similarly to S1403 above, whether or not there is a correction destination area.

If an affirmative determination result is obtained in step S1804, that is, if there is a correction destination area, the host I/O processing program 501 determines whether or not an I/O synchronization rebuild must be executed (S1806).

More specifically, the host I/O processing program 501 checks the entry in the configuration content field 1103 which corresponds to the "rebuild operation mode" of the configuration item field 1102 of the configuration table 406. At this time, if the configuration content is "High Speed," the host I/O processing program 501 determines that execution of an I/O synchronization rebuild is necessary.

If, on the other hand, the configuration content is "Normal", the host I/O processing program 501 checks the load of the logical volume 200 and, depending on the load, determines whether the I/O synchronization rebuild execution is required or not required. The load of the logical volume 200 may use the capacity utilization of the corresponding drive and may be determined from the write pending amount (the amount of dirty data in the cache). For example, if the load is low, the host I/O processing program 501 determines that the I/O synchronization rebuild execution is unnecessary to prevent a drop in the response and, if the load is high, determines that I/O synchronization rebuild execution is required. Note that the host I/O processing program 501 may dynamically change the frequency of the I/O synchronization rebuild execution in response to the load amount of the logical volume 200. Furthermore, if the host I/O is sequential access, the host I/O processing program 501 may determine that the I/O synchronization rebuild execution is required.

If an affirmative determination result is obtained in step S1806, that is, if it is determined that the execution of an I/O synchronization rebuild is necessary, the host I/O processing program 501 executes correction processing (S1810) and then ends the processing of this routine.

If a negative determination result is obtained in step S1806, that is, if it is determined that the execution of an I/O synchronization rebuild is unnecessary, the host I/O processing program 501 refers to a cache memory management table and determines whether the relevant data, that is, all the restoration source data of the read-target stripe row 204 is present in the cache memory 110 (S1805).

If the stripe data 223 corresponding to the data in the reading range exists in the failed drive 113 (if data other than that in the failed drive 113 was read in S1801), the read target data at this time is data which corresponds to the read area in the restoration-source stripe data 223.

More specifically, in the case of RAID6, for example, if a certain data portion fails among the data belonging to the stripe row 204, the data portion is restored from the other data portions and P parity (or Q parity) and hence this data is read-target data.

If a negative determination result is obtained in S1805, that is, if not all the restoration source data of the stripe row 204 for this data is in the cache memory 110, the host I/O processing program 501 reads the missing restoration source data from the drive 113 and transfers the data to the cache memory 110 (S1807).

If an affirmative result is obtained in step S1805, that is, if all the restoration-source data of all the stripe rows 204 of the data exists in the cache memory 110 or, after the processing of step S1807, the host I/O processing program 501 executes data correction processing (S1808) based on the restoration source data in the cache memory 110 (S1808).

As the data correction processing, for example in the case of RAID6, the host I/O processing program 501 restores data by means of an XOR operation using the restoration source data and P parity data.

After step S1808, the host I/O processing program 501 executes processing in which the access frequency table 405 is updated (S1809) and subsequently ends the processing of this routine.

More specifically, the host I/O processing program 501 increments the access frequency counter, of the access frequency counter field 1003 corresponding to the area access field 1002 in the access frequency table 405, by the number of times a command is issued to the drive 113, and ends the processing once the access frequency table 405 has been updated.

Note that the host I/O processing program 501 may also end the processing without executing the processing if the restoration data exists in the cache memory 110 for the reason that steps S1805 to S1809 have already been performed.

Figure 19:
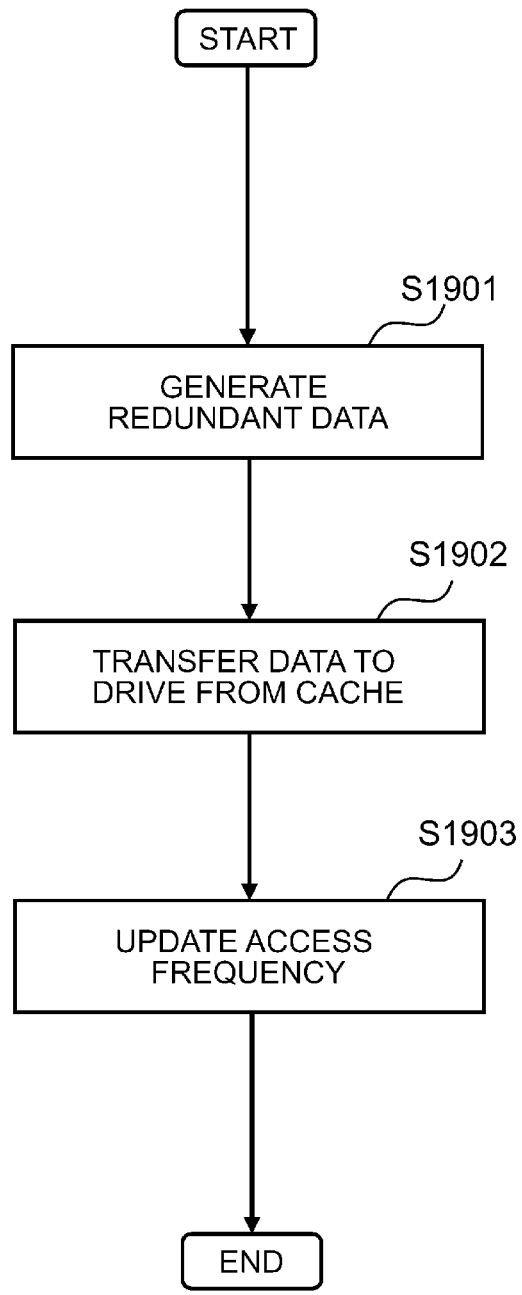
FIG. 19 is a flowchart serving to illustrate normal read processing which is a subprogram of the host I/O processing program.

FIG. 19 is a flowchart serving to illustrate normal write processing which is a subprogram of the host I/O processing program.

First, the host I/O processing program 501 generates redundant data (S1901). For example, in the case of RAID6, the host I/O processing program 501 executes an XOR operation and Galois operation from pre-update data for the write destination area, P parity pre-update data, and Q parity pre-update data, and calculates P parity data and Q parity data which correspond to the post-update data.

At this time, if the pre-update data required for this calculation processing does not exist in the cache memory 110, the host I/O processing program 501 transfers pre-update data from the drive 113 to the cache memory 110.

Thereafter, the host I/O processing program 501 transfers post-update data to the drive 113 from the cache memory 110 (S1902).

The host I/O processing program 501 subsequently performs access frequency update processing (S1903).

More specifically, the host I/O processing program 501 increments the access frequency counter of the access frequency counter field 1003 of the corresponding area in the access frequency table 405 by the number of commands issued to the drive 113 and, after updating the access frequency, terminates the processing of this routine.

Figure 20:
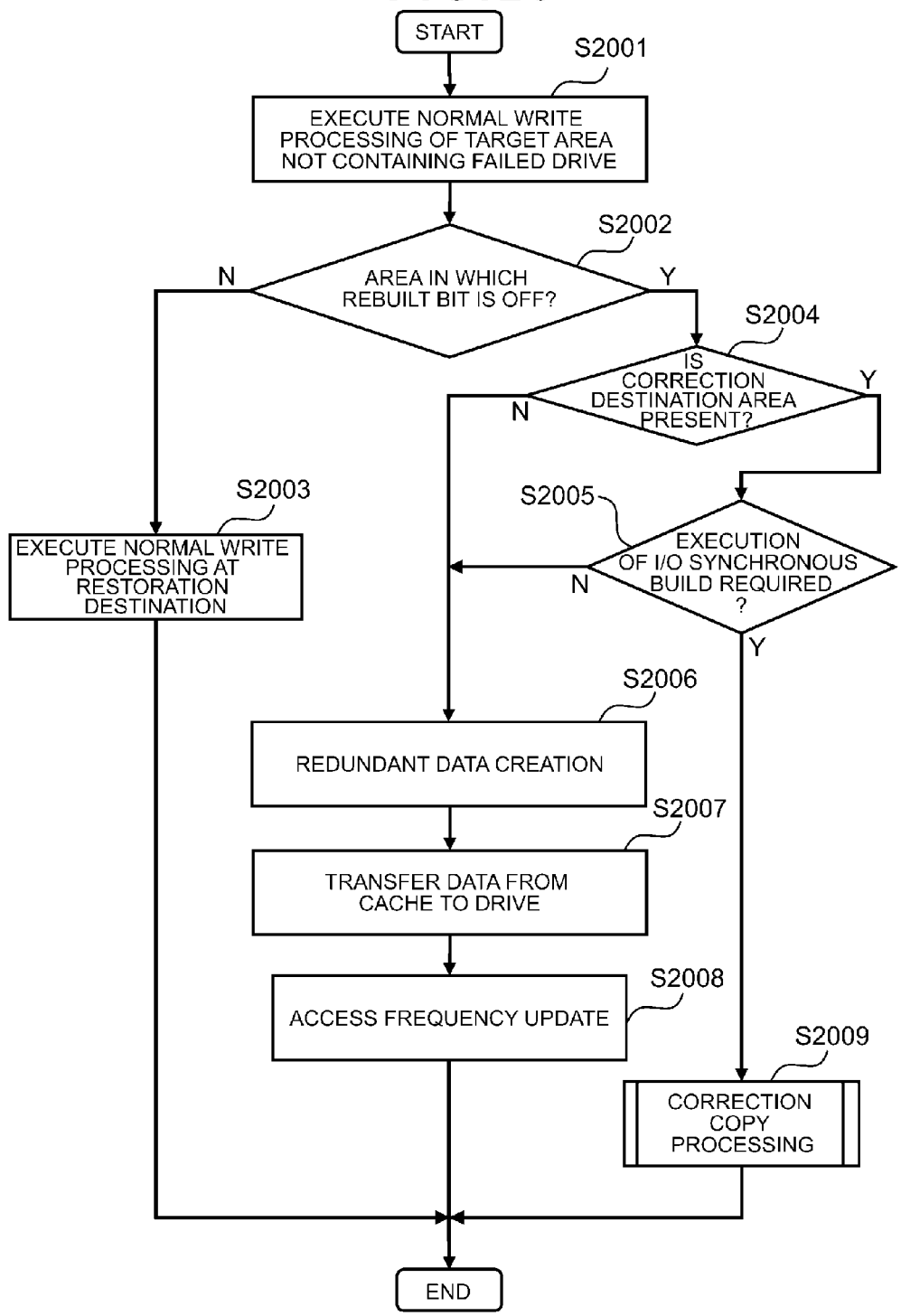
FIG. 20 is a flowchart serving to illustrate correction write processing which is a subprogram of the host I/O processing program.

FIG. 20 is a flowchart serving to illustrate correction write processing which is a subprogram of the host I/O processing program.

First, the host I/O processing program 501 executes normal write processing of the area contained in the failed drive 113 for the write target area (S2001).

More specifically, for one or more or some of the stripe rows 204 corresponding to the LBA contained in the read request from the host 101, the host I/O processing program 501 writes part of the stripe data 223 of drives other than the failed drive 113 among the drives 113 which belong to the stripe rows 204 to the drive 113.

This write processing is the same as normal write processing which is a subprogram of the host I/O processing program illustrated in FIG. 19.

Note that, even if not performed in step S2001, the write processing can be carried out in sync with the timing for write processing to another drive 113 in the course of the correction processing. In this case, the host 101 is able to delete the number of times a write command is issued.

The host I/O processing program 501 then determines whether or not the write target area is an area in which the rebuilt bit 901 is OFF (S2002).

More specifically, the host I/O processing program 501 determines whether or not the bit 901 in the rebuilt bitmap 404 which corresponds to the write target stripe row 204 is OFF.

If a negative determination result is obtained in step S2002, that is, if the bit 901 in the rebuilt bitmap 404 corresponding to the write-target stripe row 204 is ON, since the restoration destination area of a spare drive 113B or the like has already been restored, the host I/O processing program 501 executes write processing directly from the restoration source area (S2003) and ends the processing of this routine.

This write processing is similar to the normal read processing which is a subprogram of the host I/O processing program described in FIG. 19.

If an affirmative determination result is obtained in step S2002, that is, if the bit 901 of the rebuilt bitmap 404 corresponding to the write target stripe row 204 is OFF, the host I/O processing program 501 determines whether or not there is a correction destination area (S2004). In this determination processing, the host I/O processing program 501 determines, similarly to S1403 above, whether or not there is a correction destination area.

If an affirmative determination result is obtained in step S2004, that is, if there is a correction destination area, the host I/O processing program 501 determines whether or not an I/O synchronization rebuild must be executed (S2005).

More specifically, the host I/O processing program 501 checks the entry in the configuration content field 1103 corresponding to the "rebuild operation mode" in the configuration item field 1102 of the configuration table 406. If the configuration content is "High Speed" at this time, the host I/O processing program 501 determines whether an I/O synchronization rebuild must be executed.

However, if the configuration content is "Normal", the host I/O processing program 501 checks the load of the logical volume 200 concerned and, if the load is low, determines that an I/O synchronization rebuild must be executed and, if the load is high, in order to prioritize the host I/O processing, the host I/O processing program 501 determines that the execution of an I/O synchronization rebuild is unnecessary. Note that the host I/O processing program 501 is also able to dynamically change the frequency of execution of the I/O synchronization rebuild in response to the load amount of the logical volume 200 and, if the host I/O makes sequential access, is also able to determine that the execution of an I/O synchronization rebuild is required.

If an affirmative determination result is obtained in step S2005, that is, if it is determined that the execution of an I/O synchronization rebuild is necessary, the host I/O processing program 501 executes correction processing (S2009) and then ends the processing of this routine.

If a negative determination result is obtained in step S2005, that is, if it is determined that the execution of an I/O synchronization rebuild is unnecessary, or if a negative determination result is obtained in step S2004, that is, there is no correction destination area, the host I/O processing program 501 generates redundant data (S2006).

For example, in the case of RAID6, the host I/O processing program 501 executes an XOR operation and Galois operation from pre-update data for the write destination area, P parity pre-update data, and Q parity pre-update data, and calculates P parity data and Q parity data which correspond to the post-update data.

At this time, if the pre-update data required for this calculation processing does not exist in the cache memory 110, the host I/O processing program 501 transfers pre-update data from the drive 113 to the cache memory 110. However, unlike step S1902 in FIG. 19, the data for when the drive 113 which is the storage destination for redundant data and data is in a failed state need not be generated.

Thereafter, the host I/O processing program 501 transfers post-update data to the drive 113 from the cache memory 110 (S2007).

The host I/O processing program 501 subsequently performs access frequency update processing (S2008).

More specifically, the host I/O processing program 501 increments the access frequency counter of the access frequency counter field 1003 of the corresponding area in the access frequency table 405 by the number of commands issued to the drive 113 and, after updating the access frequency, terminates the processing of this routine.

Figure 21:
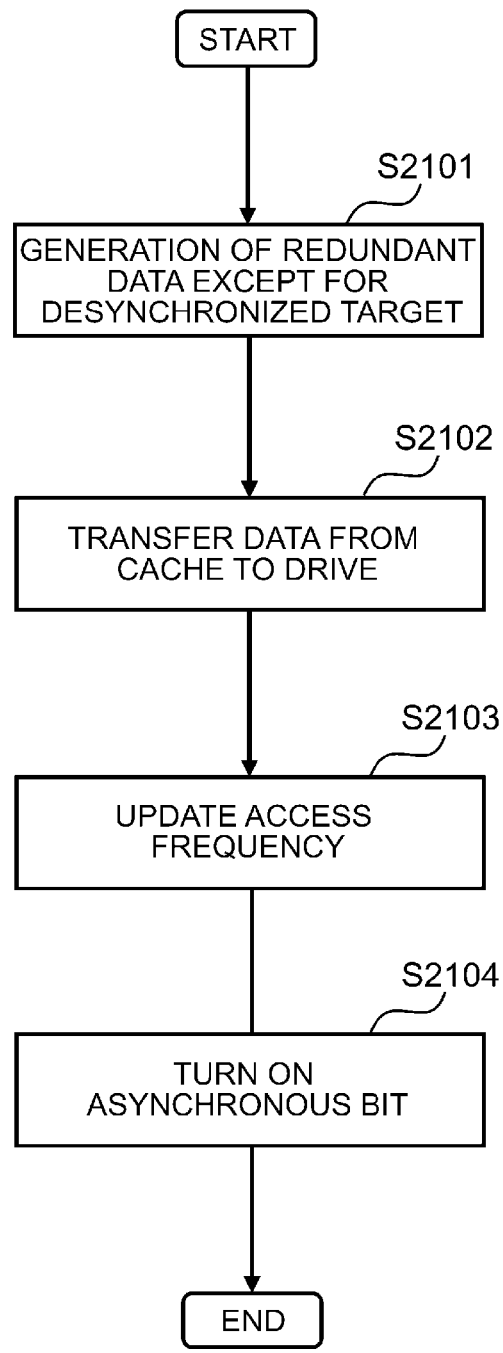
FIG. 21 is a flowchart serving to illustrate high-speed write processing which is a subprogram of the host I/O processing program.

FIG. 21 is a flowchart serving to illustrate high speed write processing which is a subprogram of the host I/O processing program.

The high-speed write processing has the effect of reducing the number of times commands are issued to the drive 113 in each single write processing as a result of not writing specific redundant data to the drive 113.

First, the host I/O processing program 501 performs the generation of redundant data excluding desynchronization targets (S2101).

At this time, the generation of redundant data is effective by taking redundant data of N−1 types or fewer as desynchronization targets at a RAID level which holds two or more (N) redundant data. This is because, when all the redundant data (N) is desynchronized, an area from which data is lost is generated at the moment a single drive 113 fails.

For example, in the case of RAID6, if, of the two redundant data, namely, the P parity and Q parity, the Q parity is taken as the desynchronization target, only the P parity is updated.

Further, at a RAID level which comprises three types of parity (P parity, Q parity, and R parity), for example, among the three types of redundant data, both the Q parity and the R parity may be desynchronization targets, or either one may be a desynchronization target Typically, if there is an N-type parity, the performance and reliability of the overall system can be made more efficient by gradually reducing the number of desynchronization parity types as the high load areas increase. In this case, reliability (MTTDL: Mean Time To Data Loss) is maximized by sequentially executing rebuild processing from the pages with a large number of desynchronization parities (double high load pages). If, for example, there are three types of parities, for the ultra-high load areas (ultra-low capacities), the Q parity and R parity are the desynchronization targets, for the high-load areas (small capacities), the R parity is the desynchronization target, and for the low-load areas (large capacities), none of the parities are desynchronization targets. When a fault arises, the processing is carried out sequentially, i.e., the rebuild is first completed for the ultra-high load areas, the rebuild is then completed for the high-load areas, and finally the rebuild is completed for the low-load areas.

Although the specific redundant data generation is the same as in S1901 in FIG. 19, the processing is carried out except for the desynchronization target redundant data, as mentioned earlier.

Thereafter, the host I/O processing program 501 transfers post-update data to the drive 113 from the cache memory 110 (S2102).

The host I/O processing program 501 subsequently performs access frequency update processing (S2103).

More specifically, the host I/O processing program 501 increments the access frequency counter of the access frequency counter field 1003 of the corresponding area in the access frequency table 405 by the number of times a command is issued to the drive 113 and updates the access frequency.

The host I/O processing program 501 subsequently turns ON the bit 701 in the asynchronous bitmap 402 (S2104) and then ends the processing of this routine.

Note that, in high-speed write processing, because an amount of the cache memory 110 proportionate to the parities for desynchronizing high-frequency areas is not secured, the unsecured area of the cache memory 110 can be adopted as a cache for other data, whereby the processing efficiency of the storage system 104 overall can be improved.

Figure 22:
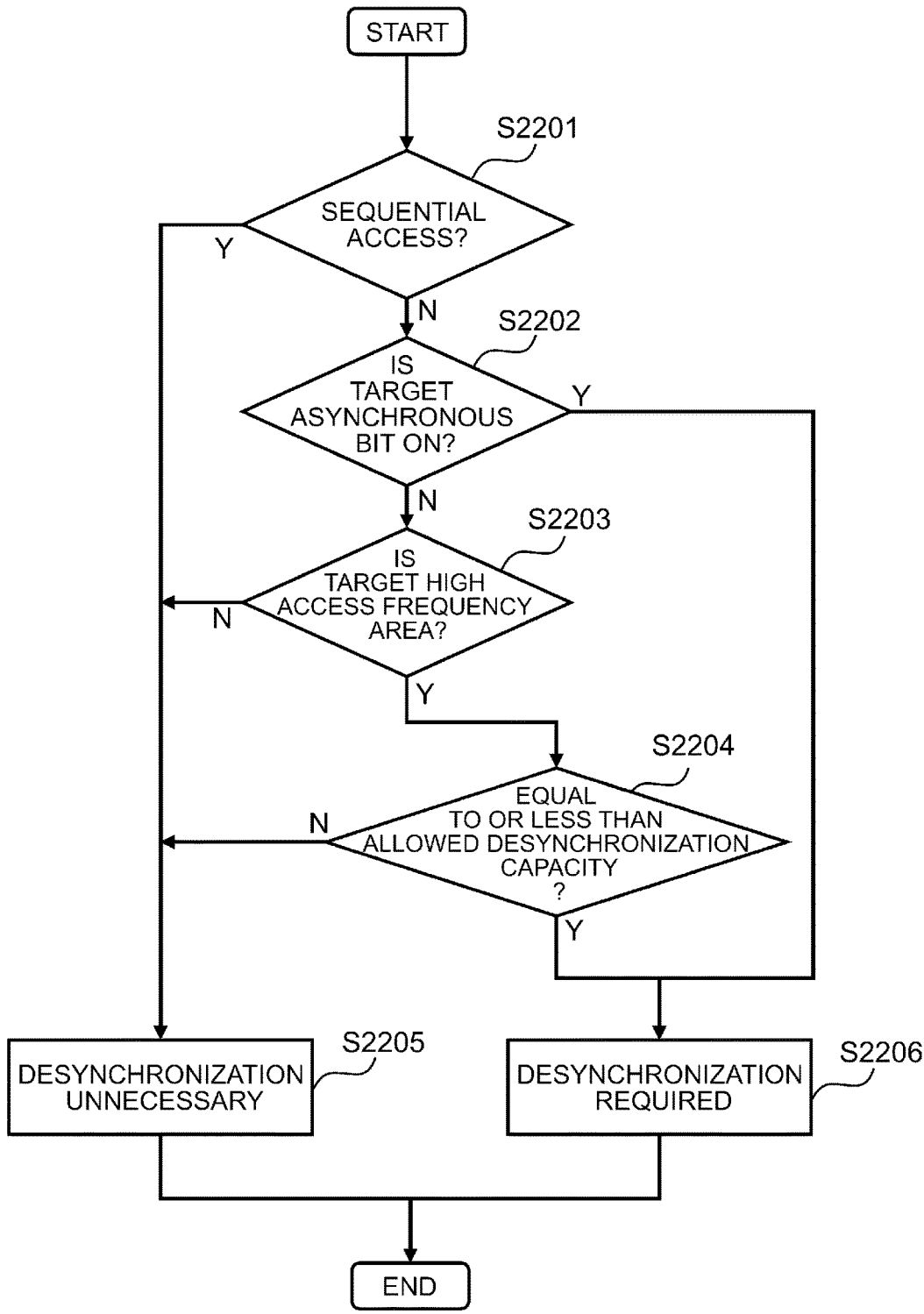
FIG. 22 is a flowchart serving to illustrate asynchronous redundant data generation determination processing which is a subprogram of the host I/O processing program.

FIG. 22 is a flowchart serving to illustrate the asynchronous redundant data generation determination processing which is a subprogram of the host I/O processing program.

First, the host I/O processing program 501 determines whether access is sequential based on the I/O processing request from the host 101 (S2201).

At this time, in a case where the transfer length contained in the command of the I/O processing request from the host 101 exceeds a fixed length and so on, the host I/O processing program 501 determines, from the history of LBA addresses in the plurality of I/O process requests, whether access is sequential depending on whether there has been access to successive areas.

If an affirmative determination result is obtained in step S2201, that is, if access is sequential, the host I/O processing program 501 renders synchronization of the area unnecessary (S2205) and ends the processing of this routine.

This is because, if access is sequential, no access to the drive is required because redundant data can be generated simply from the write data on cache.

If a negative determination result is obtained in step S2201, that is, if there is no sequential access, the host I/O processing program 501 determines whether or not the bit 701 in the targeted asynchronous bitmap 402 is ON (S2202).

If a negative determination result is obtained in step S2202, that is, if the bit 701 in the targeted asynchronous bitmap 402 is OFF, the host I/O processing program 501 determines whether the target is a high access frequency area (S2203).

At this time, the host I/O processing program 501 is able to determine, for example, whether or not the value of the access area counter field 1003 of the target area in the access frequency table 405 exceeds the access frequency threshold value.

If a negative determination result is obtained in step S2203, that is, if the target is not a high access frequency area, the host I/O processing program 501 renders desynchronization for this area unnecessary (S2205) and ends the processing of this routine.

If an affirmative determination result is obtained in step S2203, that is, if the target is a high access frequency area, the host I/O processing program 501 determines whether or not the target lies within an allowed desynchronization capacity (S2203).

More specifically, the host I/O processing program 501 compares the value of the configuration content field 1103 "allowed desynchronization capacity" in the configuration item field 1102 corresponding to the logical volume 200 constituting the target in the configuration table 406, with the value of the asynchronous area counter field 802 corresponding to the target logical volume 200 in the asynchronous area counter field 403 and, if the value of the asynchronous area counter field 802 is incremented and the value of the asynchronous area counter field 802 exceeds the value of the configuration content field 1103 with the "allowed desynchronization capacity", the host I/O processing program 501 determines that this value is not equal to or less than the allowed desynchronization capacity.

Furthermore, the host I/O processing program 501 determines that the value of the asynchronous area counter field 802 is equal to or less than the allowed desynchronization capacity in cases where the value does not exceed the value of the configuration content field 1103 for the "allowed desynchronization capacity."

Further, if the bit 701 in the asynchronous bitmap 402 of the target area is already ON, the host I/O processing program 501 determines unconditionally that the value is equal to or less than the allowed desynchronization capacity.

If a negative determination result is obtained in step S2204, that is, if it is determined that the value is not equal to or less than the allowed desynchronization capacity, the host I/O processing program 501 renders the desynchronization of the area unnecessary (S2205) and ends the processing of this routine.

If an affirmative determination result is obtained in step S2204, that is, if it is determined that the value is equal to or less than the allowed desynchronization capacity, or if an affirmative determination result is obtained in step S2202, that is, if the bit 701 in the targeted asynchronous bitmap 402 is ON, the host I/O processing program 501 renders desynchronization of this area unnecessary (S2206) and ends the processing of this routine.

Note that in the foregoing steps, part of the determination processing may be omitted or all the determination processing may be performed.

Figure 23:
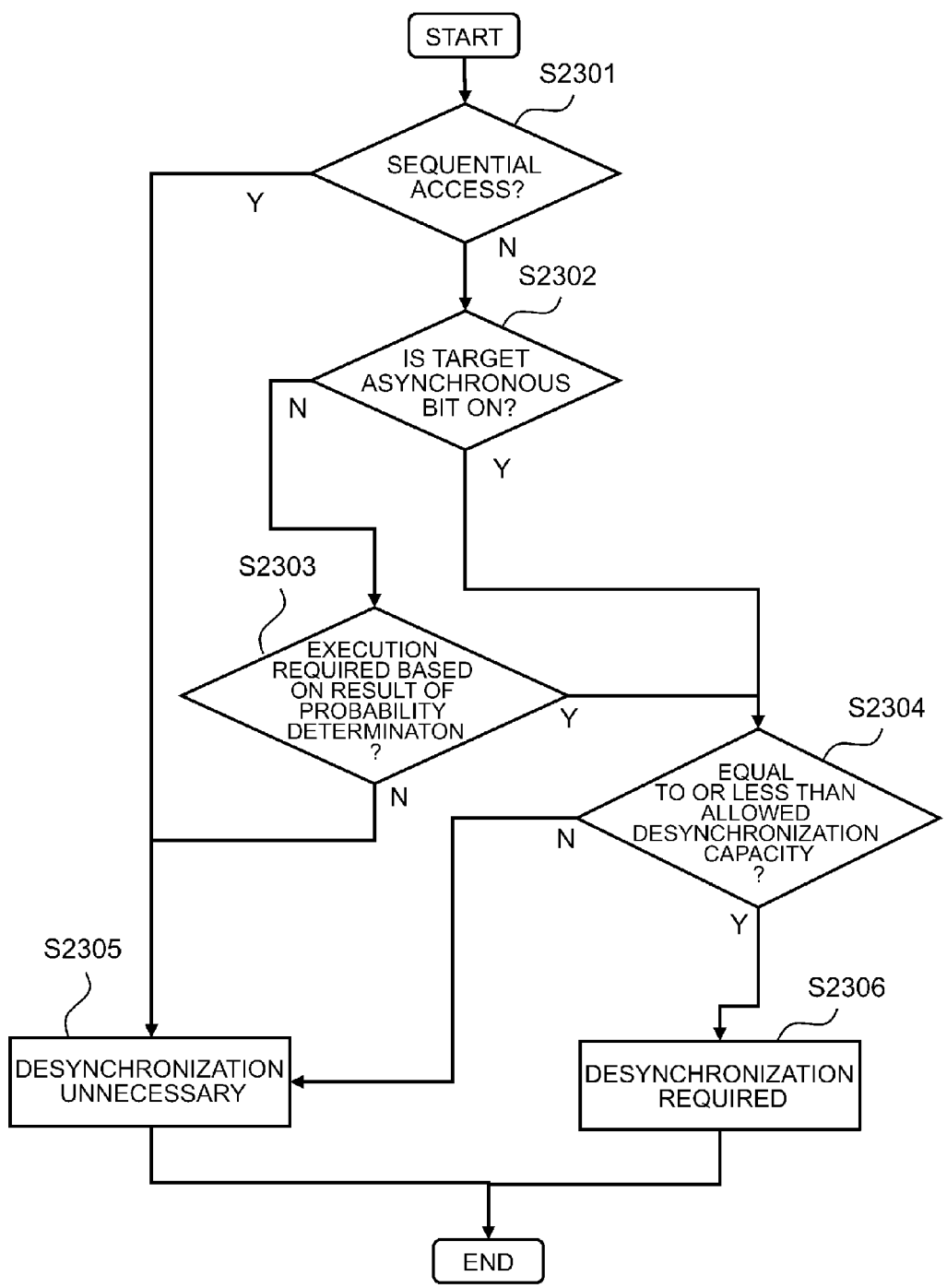
FIG. 23 is a flowchart serving to illustrate asynchronous redundant data generation determination processing which is a subprogram of the host I/O processing program.

FIG. 23 is a flowchart serving to illustrate asynchronous redundant data generation determination processing which is a subprogram for the host I/O processing program.

This processing differs from the method described in FIG. 22 and is a method which does not use the access frequency table 405 and which performs desynchronization by prioritizing high frequency areas. Note that, in this processing, only those points of difference from the flowchart illustrated in FIG. 22 will be described.

The host I/O processing program 501 determines whether or not the bit 701 in the targeted asynchronous bitmap 402 is ON in cases where it is determined in step S2301 that the target is not subject to sequential access (S2302).

If an affirmative determination result is obtained in step S2302, that is, if bit 701 in the targeted asynchronous bitmap 402 is ON, the host I/O processing program 501 moves to step S2304 and executes processing which is similar to step S2204.

If a negative determination is obtained in step S2302, that is, if bit 701 of the targeted asynchronous bitmap 402 is OFF, the host I/O processing program 501 determines whether execution is required based on the result of the probability determination (S2303).

More specifically, the host I/O processing program 501 is also able to determine that execution is required once in M times by using the counter in the local memory 118, for example. Note that, at this time, a method of controlling another frequency may also be used.

If an affirmative determination result is obtained in step S2303 is obtained, the host I/O processing program 501 migrates to the processing of the step S2304 and executes the same processing as step S2204. Furthermore, if a negative determination result is obtained in step S2303, the host I/O processing program 501 moves to the processing of step S2305 and executes the same processing as step S2205.

As a result of the foregoing processing, even when the access frequency table 405 is not used, since there is a high probability that an area with a high access frequency will be desynchronized, an effect close to the method illustrated in FIG. 22 can be obtained.

Furthermore, other than the method described in the foregoing description, a conditional determination for discarding either desynchronization not required or desynchronization required depending on the drive utilization and the write pending amount (the amount of data, in the cache, which has not been mirrored) may be added before S2303, for example. If, for example, the drive utilization is low, it may be determined that there is a minimal deterioration effect on the throughput and response and, except for a case where a targeted asynchronous bit is already on, desynchronization is not required may be selected. Further, if the write pending amount is small, it may likewise be determined that there is a minimal deterioration effect on the throughput and response and, except for a case where a targeted asynchronous bit is already on, desynchronization is not required may be selected. By adding this conditional determination, unnecessary expansion of the desynchronization target area can be suppressed, yielding an effect whereby reliability can be further improved.

Figure 24:
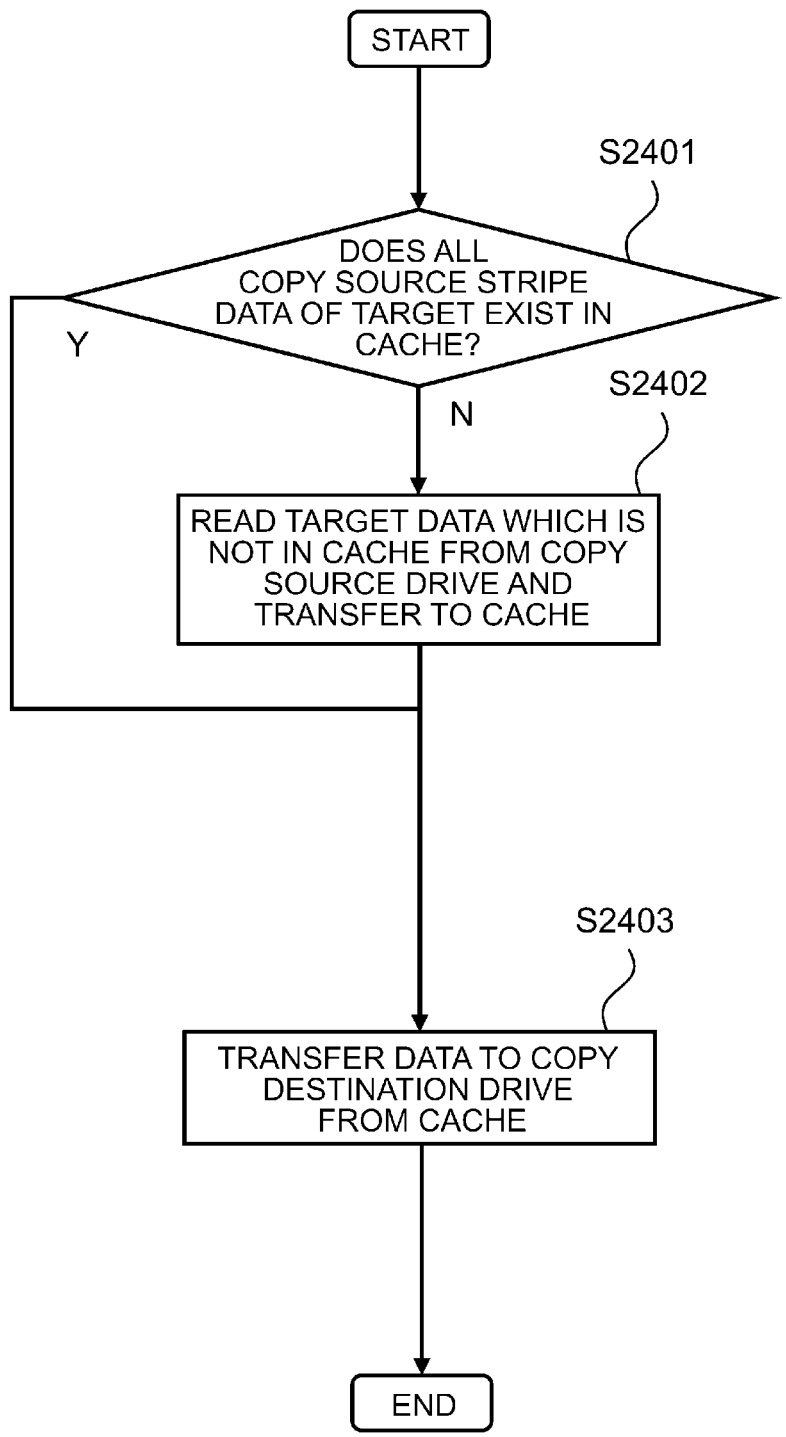
FIG. 24 is a flowchart serving to illustrate normal copy processing which is a subprogram of a drive copy processing program.

FIG. 24 is a flowchart serving to illustrate normal copy processing which is a subprogram of the drive copy processing program.

First, the drive copy processing program 504 determines whether or not all the targeted copy source stripe data 223 is in the cache memory 110 (S2401).

If a negative determination result is obtained in S2401, that is, if not all the targeted copy source strip data 223 is in the cache memory 110, the drive copy processing program 504 reads the target data which is not in the cache memory 110 from the copy source drive 113 and transfers the target data thus read to the cache memory 110 (S2402).

The drive copy processing program 504 subsequently transfers data from the cache memory 110 to the copy destination drive 113 (S2403) and ends the processing of this routine.

Furthermore, if an affirmative determination result is obtained in step S2401, that is, if all the targeted copy source stripe data 223 is in the cache memory 110, the drive copy processing program 504 transfers the data from the cache memory 110 to the copy destination drive 113 (S2403) and ends the processing of this routine.

Figure 25:
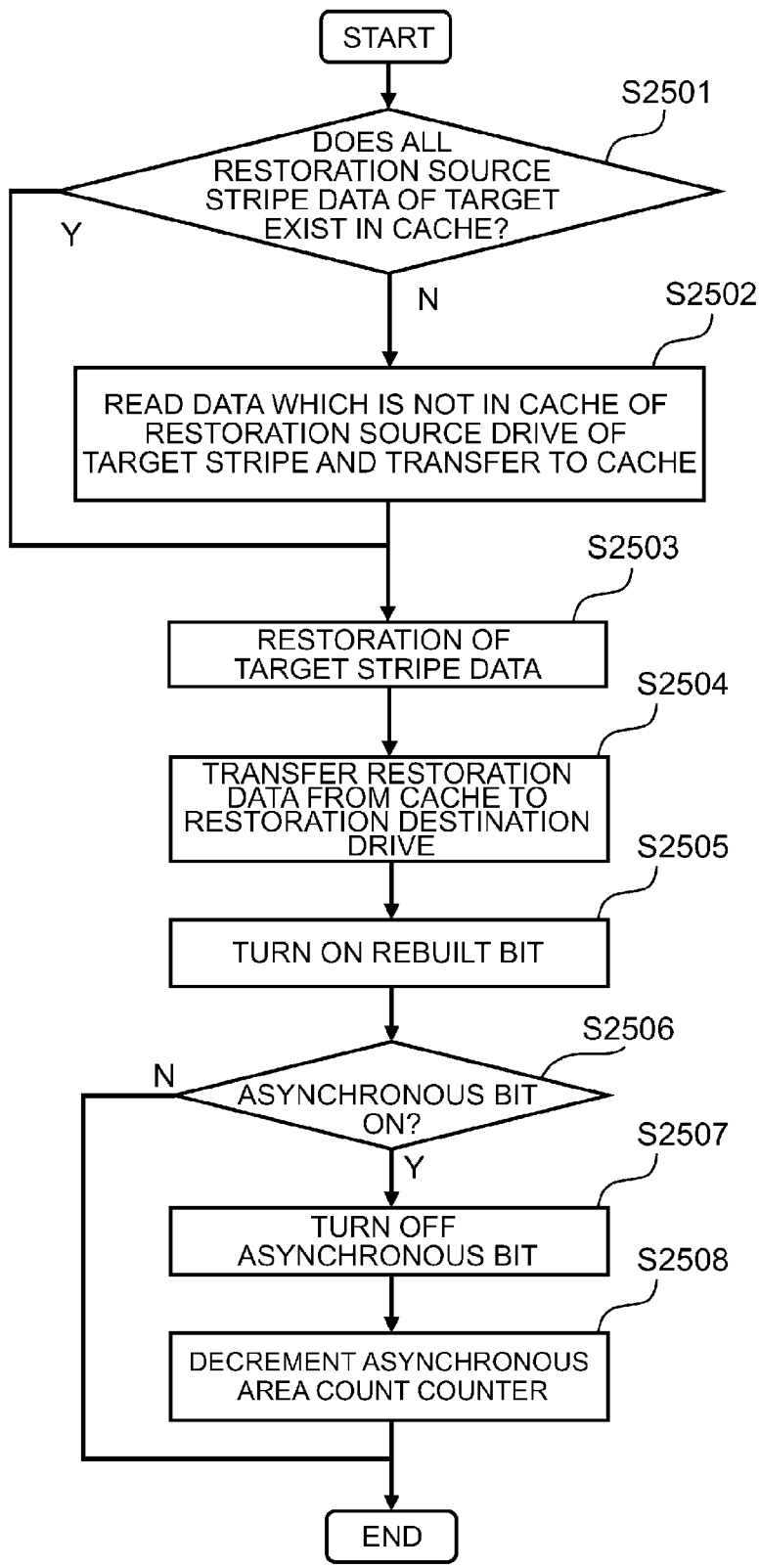
FIG. 25 is a flowchart serving to illustrate correction copy processing which is a subprogram of the host I/O processing program.

FIG. 25 is a flowchart serving to illustrate the collection copy processing which is a subprogram of the drive copy processing program, rebuild processing program, and host I/O processing program.

This processing is executed by any of the programs among the drive copy processing program 504, the rebuild processing program 503, and the host I/O processing program 501. Note that a case where the host I/O processing program 501 is executed in this processing will be described.

The host I/O processing program 501 determines whether all the targeted restoration source stripe data 223 is in the cache memory 110 (S2501).

If a negative determination result is obtained in step S2501, that is, if not all target restoration source stripe data 223 is in the cache memory 110, the host I/O processing program 501 reads the target data which is not in the cache memory 110 from the restoration source drive 13, and transfers the target data thus read to the cache memory 110 (S2502).

The host I/O processing program 501 subsequently performs restoration of the target stripe data 223 (S2503), transfers the restored restoration data from the cache memory 110 to the restoration destination drive 113 (S2504) and advances to step S2505.

If, however, an affirmative determination result is obtained in step S2401, that is, if all the target restoration source stripe data 223 is in the cache memory 110, the host I/O processing program 501 performs restoration of the target stripe data 223 (S2503), transfers the restored restoration data from the cache memory 110 to the restoration destination drive 113 (S2504) and advances to step S2505.

In step S2505, the host I/O processing program 501 turns ON the rebuilt bit which corresponds to the processing target stripe row 204 (S2505) and, if the asynchronous bit corresponding to the processing target stripe row 204 is ON (S2506), turns OFF the asynchronous bit (S2507), and subsequently decrements the number of asynchronous area counter fields 802 (S2508), and terminates the routine. As a result of this decrement processing, the rebuild processing program 503 is able to manage the number of areas for which the rebuilt bit is ON.

Meanwhile, if the asynchronous bit which corresponds to the processing target stripe row 204 is not ON in step S2506, the host I/O processing program 501 terminates the routine.

Figure 26:
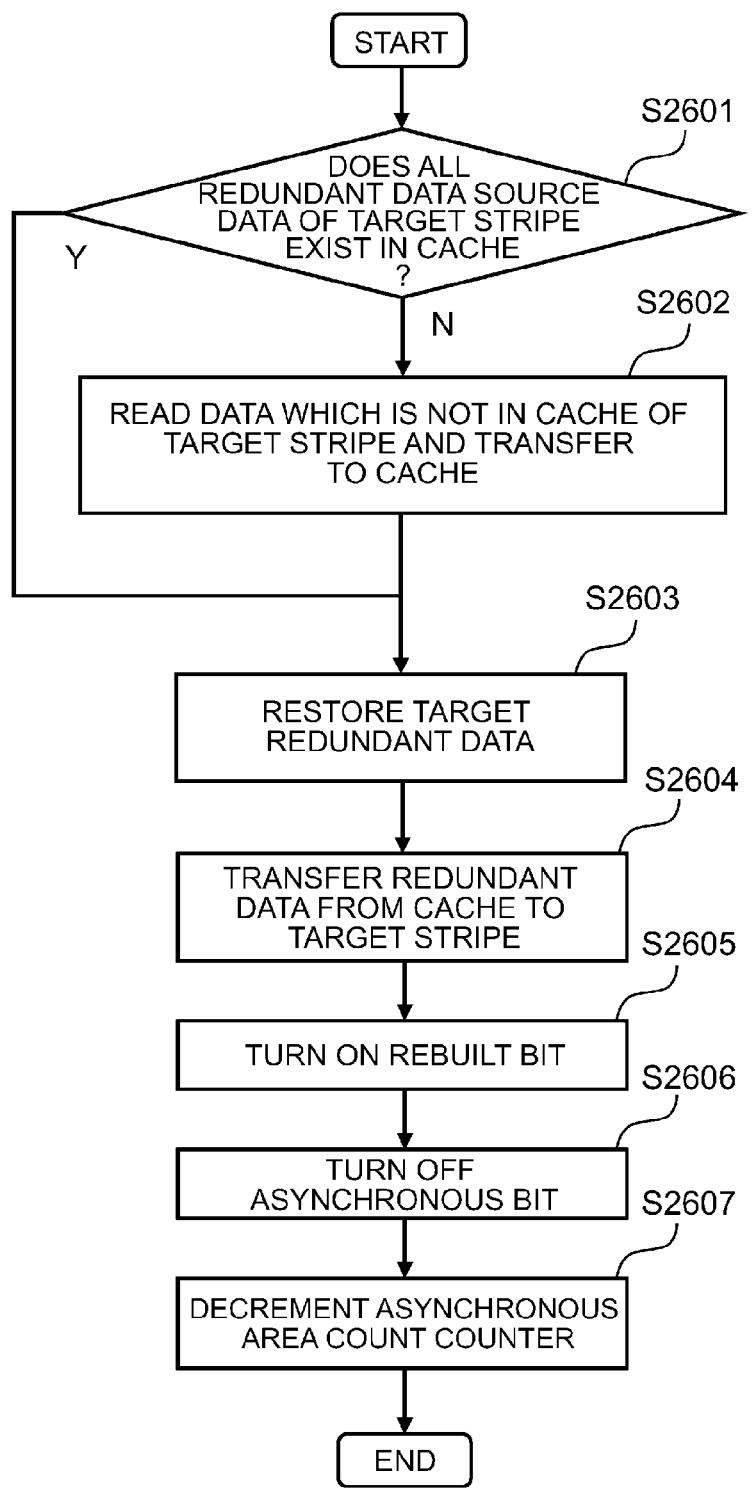
FIG. 26 is a flowchart serving to illustrate asynchronous redundant data correction processing which is a subprogram of the rebuild processing program.

FIG. 26 is a flowchart serving to illustrate asynchronous redundant data correction processing which is a subprogram of the rebuild processing program.

First, the rebuild processing program 503 determines whether or not all the redundant data generation source data of the target is in the cache memory 110 (S2601).

If a negative determination result is obtained in step S2601, that is, if not all the targeted redundant data generation source stripe data 223 is in the cache memory 110, the rebuild processing program 503 reads the target stripe data 223 from the drive 113 and transfers the read stripe data 223 to the cache memory 110 (S2602).

The rebuild processing program 503 subsequently performs restoration of the targeted redundant data (S2603), transfers the redundant data thus restored to the target drive 113 from the cache memory 110 (S2604), turns ON the rebuilt bit which corresponds to the processing target stripe row 204 (S2605), turns OFF the asynchronous bit (S2606), subsequently decrements the number of asynchronous area counter fields 802 (S2607), and ends the processing of this routine.

If an affirmative determination result is obtained in step S2401, that is, if all the targeted restoration source stripe data 223 is in the cache memory 110, the rebuild processing program 503 performs restoration of the targeted restoration data (S2603), transfers the redundant data thus restored from the cache memory 110 to the targeted drive 113 (S2604), turns ON the rebuilt bit which corresponds to the processing target stripe row 204 (S2605), then turns OFF the asynchronous bit (S2606), subsequently decrements the number of asynchronous area counter fields 802 (S2607), and ends the processing of this routine.

Figure 27:
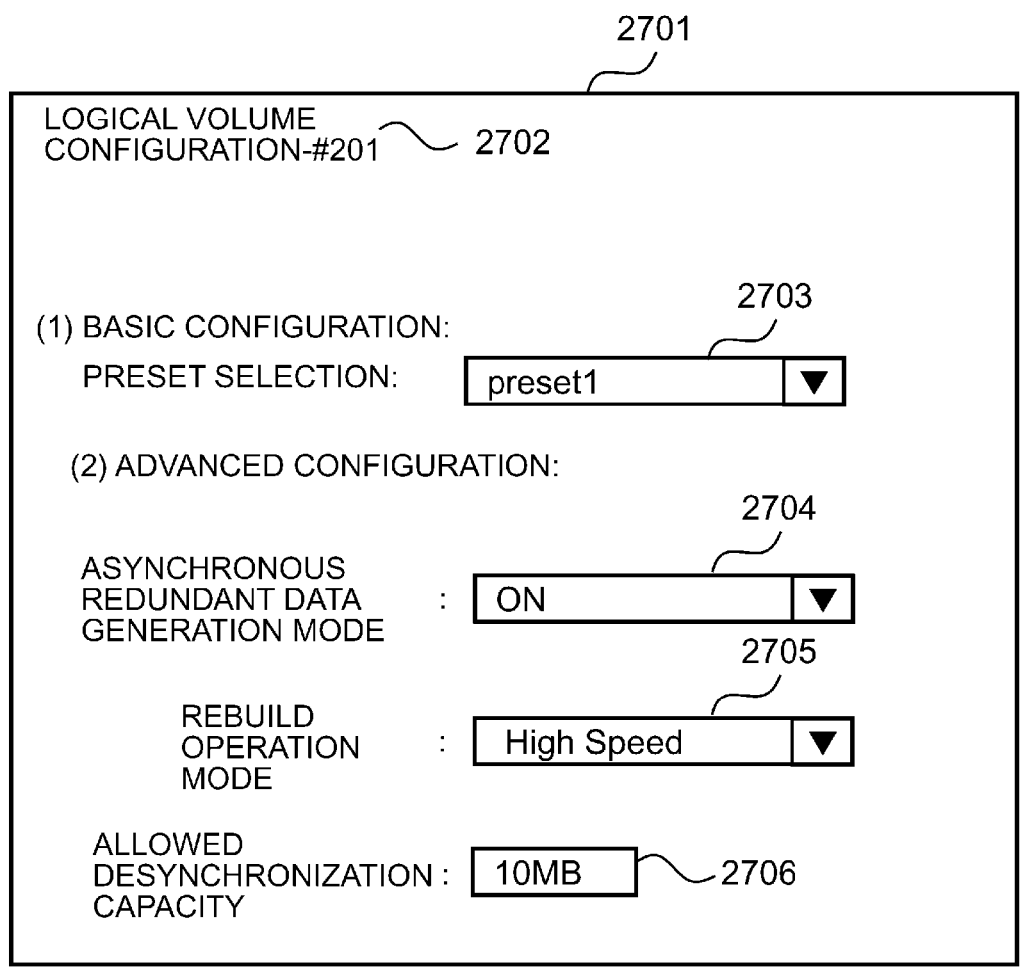
FIG. 27 is a constitutional view of a screen showing a GUI for configuring parameters for each logical volume.

FIG. 27 is a constitutional view of a screen which shows a GUI for configuring parameters for each logical volume.

In FIG. 27, the configuration screen 2701 is configured from an area 2702 which displays a logical volume number which is able to specify a configuration target logical volume 200, an area 2703 for selecting a simple configuration, and areas 2704, 2705, and 2706 on which advanced configuration is performed.

As the asynchronous redundant data generation mode, "ON" is configured for the area 2704 if an update of the redundant data is delayed only in a high-frequency access area, and "OFF" is configured if a redundant data update is always performed.

As the rebuild operation mode, "High speed" is configured for the area 2705 if an I/O synchronous rebuild is always performed and "Normal" is configured if rebuild processing is executed by prioritizing host I/O.

As the allowed desynchronization capacity, the maximum size of the target area, for example 10 MB, is configured for the area 2706 if a redundant data update is delayed only in a high frequency access area.

If areas 2704, 2705, and 2706 are each configured, the processor 119 newly configures or updates the entry for the logical volume 200 which is configured in area 2702 in the configuration table 406. That is, [the processor 119] determines the allowed desynchronization capacity configured for area 2706 by converting the capacity (MB) of the target area into the number of stripe rows 204, and stores the converted number in the configuration table 406 as the value in the configuration content field 1103 which corresponds to the "allowed desynchronization capacity" in the configuration item field 1102 in the configuration table 406.

Note that the configuration values in the advanced configuration described hereinabove are saved at a level "preSet1" and "preSet1" may simply be configured in area 2703.

Figure 28:
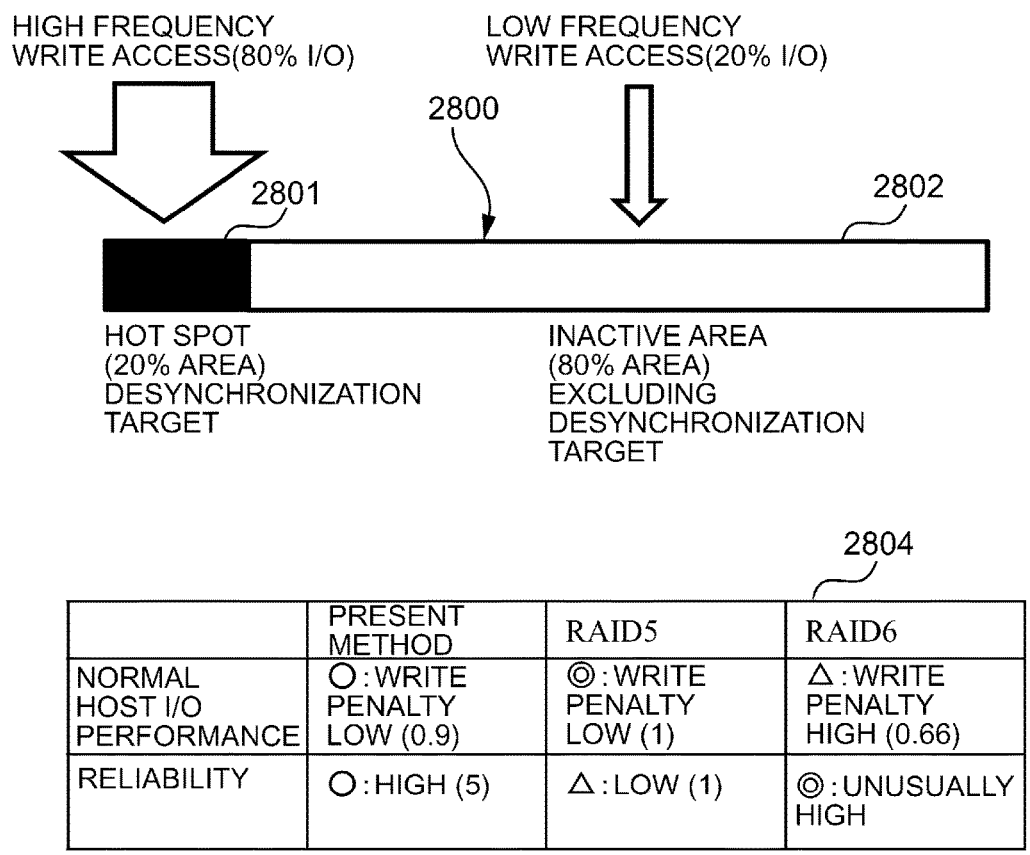
FIG. 28 is an explanatory diagram serving to illustrate the effects of the present invention.

FIG. 28 is an explanatory diagram serving to illustrate the effect of the present invention.

In FIG. 28, the write access target area 2800 may be divided into an area 2801 subject to high frequency write access and an area 2802 subject to low frequency write access, for example.

Here, area 2801 is an area in which 80% of the I/O load is concentrated in an area which is a total of 20% of area 2800, for example (hereinafter this will sometimes be referred to as a hot spot). Area 2802 is, for example, an area in which 20% of the I/O load is generated in 80% of the total area of area 2800 (hereinafter may be referred to as an inactive area).

As mentioned earlier, if a bias toward IO is assumed, the effect of the present invention is represented in table 2804 hereinbelow.

Table 2804 shows that the effect of write penalties can be curbed for the whole system in comparison with RAID6 in order to delay a parity write of the high frequency write access area 2801 as a result of the system of the present invention and reliability can also be improved over RAID5.

More specifically, if it is assumed that the host access is write-only random access, in the case of RAID5, four drive accesses are generated by way of a single host access. The host I/O throughput performance is ¼. In the case of RAID6, six drive accesses are generated by a single host access. Accordingly, the host I/O throughput performance is ⅙.

However, in this system, a single host access to the hot spot 2801 is equivalent to four drive accesses and a single host access to an inactive area 2802 is equivalent to six drive accesses.

Accordingly, the average number of drive accesses for a single host access 1/(4*0.8+6*0.2)=4.4 and the host I/O throughput performance is 1/4.4.

Here, when there is a single RAID5 throughput, the RAID6 throughput is 0.66 due to the significant effect of write penalties; however, the throughput of this system is 0.9 and the reduction in throughput can be curbed without the effect of write penalties which RAID6 is subject to.

Furthermore, since the hot spot 2801 is 20% of the total area 2800, the redundancy restoration time when drive failure occurs can be reduced by 20%. Accordingly, the reliability of the logical volume 200 (MTTDL: Mean Time To Data Loss) is compared with RAID56 and can be improved up to a maximum of five times.

Furthermore, if the rebuild operation mode is configured as "High Speed", performing I/O-synchronized rebuild processing even with the host I/O in a high load state has the effect of reducing the rebuild time, thereby further improving reliability.

Figure 29:
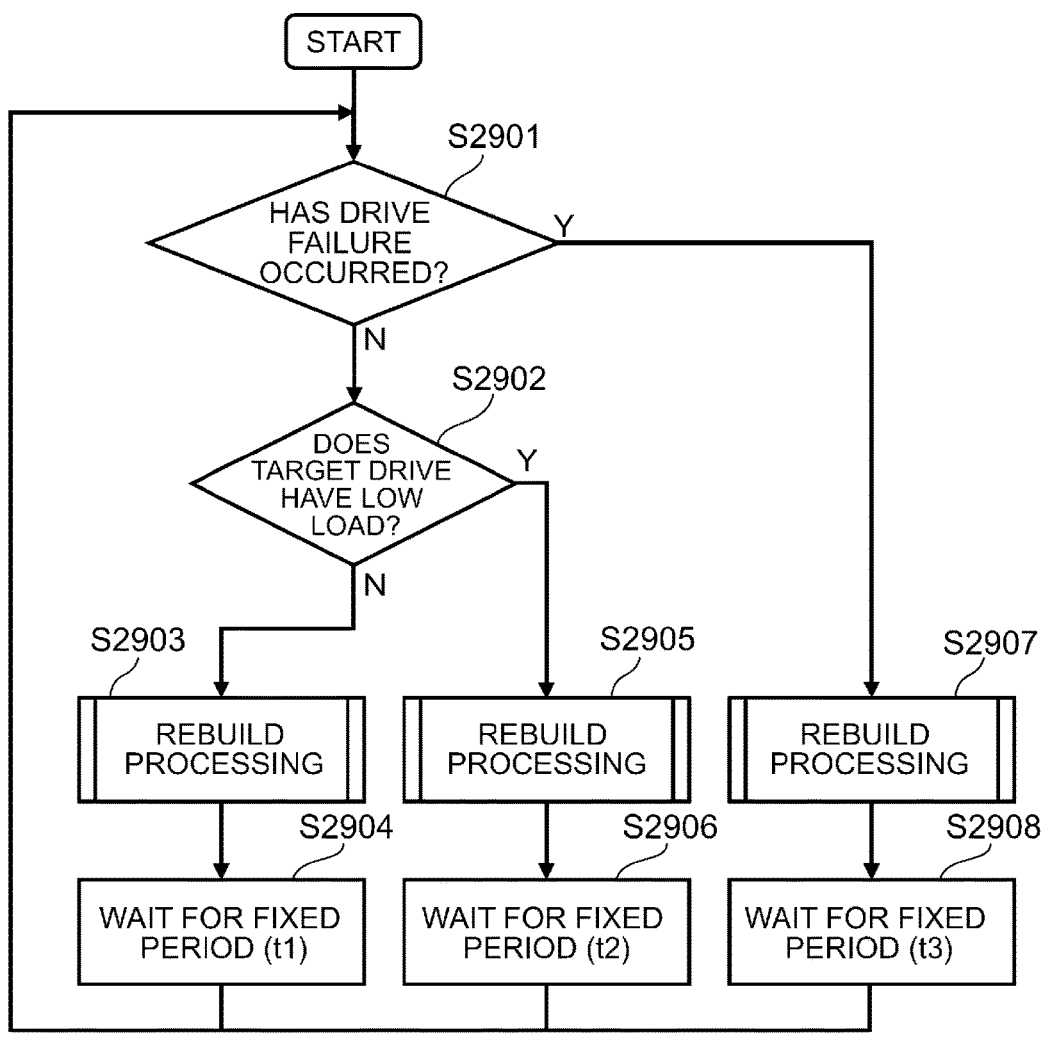
FIG. 29 is a flowchart serving to illustrate the processing of a rebuild processing execution control program.

FIG. 29 is a flowchart serving to illustrate the processing of the rebuild processing execution control program.

The rebuild processing execution control program 505 is a program for controlling the trigger for executing the rebuild processing program 503.

The rebuild processing execution control program 505 is a process which starts to run before the storage system is I/O accessible by the host and which continues to operate asynchronously.

First, the rebuild processing execution control program 505 determines whether or not drive failure occurs (S2901). Here the rebuild processing execution control program 505 refers to the drive state field 605 in the logical/physical address conversion table 401, for example, and determines whether or not a failed drive 113 exists.

If a negative determination result is obtained in step S2901, that is, if drive failure has not occurred, the rebuild processing execution control program 505 determines whether the targeted drive 113 has a low load (S2902).

Here, the rebuild processing execution control program 505 determines whether the total value of the access frequency counter of the access frequency counter field 1003 of the target logical volume 200 in the access frequency table 405 exceeds a fixed threshold, for example. Note that the rebuild processing execution control program 505 may hold an access frequency counter for each logical volume number separate from the value of the access frequency counter field 1003 and determine whether the amount held exceeds the fixed threshold.

If a negative determination result is obtained in step S2902, that is, if the target drive 113 does not have a low load, [the rebuild processing execution control program 505] executes rebuild processing (S2903) and subsequently returns once again to step S2901 after a fixed time has elapsed (S2904) and executes the processing of step S2901.

Note that when drive failure occurs or in a state where the target drive 113 has a low load, the rebuild processing execution control program 505 may also suspend the processing of step S2904 for a fixed period and move to the processing of step S2901.

If step S2902 obtains an affirmative determination result, that is, if the target drive 113 has a low load, the rebuild processing execution control program 505 executes rebuild processing (S2905) and then returns once again to step S2901 after a fixed time has elapsed (S2906) and executes the processing of step S2901.

Note that the rebuild processing execution control program 505 may also suspend the processing of step S2906 for a fixed period and move to the processing of step S2901 when drive failure occurs.

If, on the other hand, an affirmative determination result is obtained in step S2901, that is, if a failed drive 113 exists, the rebuild processing execution control program 505 executes rebuild processing (S2907) and subsequently returns once again to step S2901 after a fixed time has elapsed (S2908) and executes the processing of step S2901.

By differentiating the lengths (t1, t2, t3) of the respective periods of the periods of a fixed duration in the foregoing steps S2904, S2906, and S2908 (t1 is greater than t2 which is greater than t3, for example), the frequency of the rebuild processing and the load on the drive 113 caused by the rebuild processing can be adjusted. For example, when a drive fails, a short wait time can be configured in order to further shorten the rebuild processing time to avoid the danger of data loss. In addition, in a case where the drive 113 has a low load, because the load on the drive 113 by the host 101 is low, a short wait time can be configured in order to carry out the rebuild processing more proactively. Naturally, the wait time may be adjusted not only in the two stages high load and low load as per the foregoing example, but also more gradually.

With this example, in a storage system which supports a redundant disk configuration, while securing fault tolerance, it is possible to prevent a longer drive access time as well as a drop in I/O throughput when a redundant data update, generated due to a data update, is mirrored in the drive. This enables high reliability to be realized while maintaining an ordinary random write performance with low redundancy.

Second Example

Figure 30:
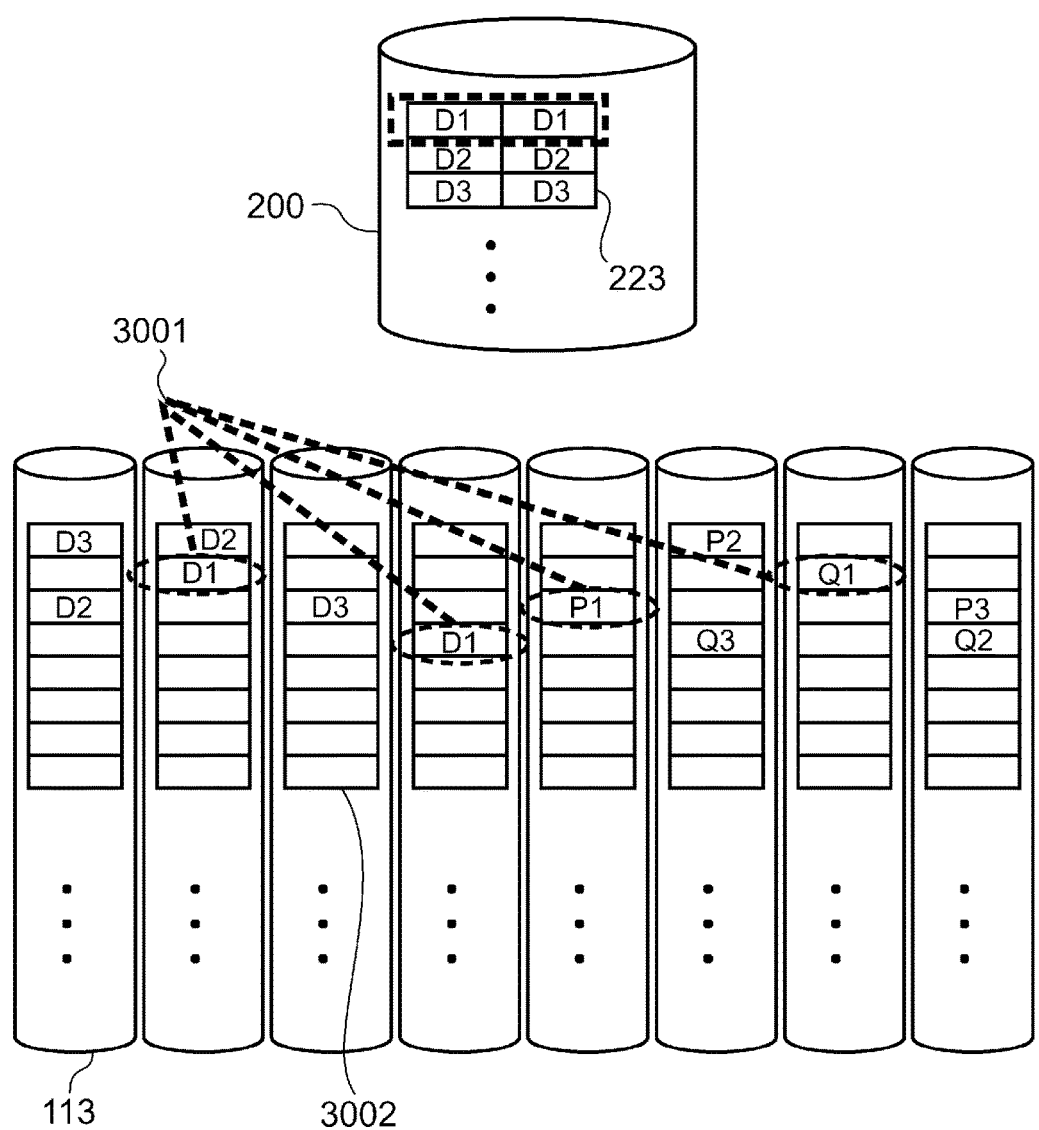
FIG. 30 is a logical constitutional view of a computer system according to a second example of the present invention.

FIG. 30 is a logical constitutional view of a computer system according to a second example of the present invention.

Hereinafter, only the points which differ from FIG. 2 in the logical configuration of the computer system according to the second example of the present invention will be described.

The method of the first example does not depend on where in the drive 113 the stripe data 223 is disposed. For example, the stripe row 204 need not be constituted by eight drives 113A as per FIG. 2, rather, the stripe row 204 may be constituted by using all the drives 113 mounted in the storage system 104 or the stripe row 204 may be constituted by using some of the drives 113. The same is also true of the used areas of the spare drives 113B.

However, in the second Example, as shown in FIG. 30, the stripe row 3001 is randomly assigned from the drives 113.

When the stripe row 3001 is randomly assigned to the drives 113, then a plurality of strip data 3002 are not disposed in the same drive 113.

This serves to prevent low redundancy. The spare drives 113B are used by assigning unused stripe data 3002. It goes without saying that the spare drives 113B are selected so that the plurality of stripe data 3002 are not disposed in the same drives 113B.

Furthermore, this Example can be applied not only to the placement of data as in RAID6 but also to Triplication.

More specifically, in the case of a normal Triplication configuration, two redundant data are created in the drives 113 for a single data item and are synchronously updated in triplicate.

With this example, by performing three asynchronous data updates of areas with a high load, the effect of write penalties on performance can be reduced (to resemble the duplication state of RAID1 or similar).

Moreover, the foregoing method, in combination with technology for reducing the parity capacity as disclosed in PTL2, allows for greater efficiency by bringing the capacity available to the user closer to the physical capacity.

INDUSTRIAL APPLICABILITY

As described in detail hereinabove, the present invention can be used in a storage system which manages a plurality of drives 113 as redundant data storage areas and, while securing fault tolerance, it is possible to prevent a longer drive access time as well as a drop in I/O throughput when a redundant data update, generated due to a data update, is mirrored in the drive.

Note that the present invention is not limited to the foregoing Examples and includes a variety of modified examples. For example, the foregoing Examples were described in detail in order to facilitate an understanding of the present invention but the present invention is not necessarily limited to having all the configurations illustrated. Further, part of the configuration of a certain example can be replaced with the configuration of another example, and the configuration of another Example can also be added to the configuration of a certain Example. In addition, part of the configuration of each Example may also be added to, deleted from, or replaced with another configuration.

In addition, some or all of each of the configurations above, functions, processing parts, and processing means and the like may also be realized by hardware, i.e. designed by an integrated circuit, or the like, for example. Further, each of the foregoing configurations and functions and the like may also be realized using software as a result of a processor parsing and executing programs for realizing the respective functions. Information of the programs, tables, and files and so on which realize each of the functions may also be recorded on recording devices such as a memory, hard disk or SSD (Solid State Drive) or recorded on media such as an IC (Integrated Circuit) card, SD (Secure Digital) memory card, DVD (Digital Versatile Disc).

REFERENCE SIGNS LIST

101 Host
102 Management server

103 Network
104 Storage system
106 Port
107 Service I/F
109 Processor package
110 Cache memory
111 Shared memory
112 Internal network
113 Drive
118 Local memory
119 Processor

The invention claimed is:

1. A storage system comprising a plurality of storage devices and a processor,
wherein each of a plurality of stripe rows comprises a predetermined number of data elements including a plurality of data and at least two redundant data for the plurality of data,
wherein the processor is configured to:
store each of the predetermined number of data elements in different storage devices of the plurality of storage devices, and
dispersively store, in the plurality of storage devices, a plurality of data elements included in the plurality of stripe rows, wherein the number of the plurality of storage devices is greater than the predetermined number, such that stripes rows are composed of unique combinations of physical storage devices, and
wherein when at least one storage device in the plurality of storage devices fails, the processor is configured to rebuild a data element, which is stored in the failed storage device, in a stripe row with a low redundancy level prior to rebuilding a data element in a stripe row with a redundancy level higher than the low redundancy level, on the basis of data elements in storage devices other than the failed storage device among data elements in the stripe row with the low redundancy level.

2. The storage system according to claim 1,
wherein the plurality of storage devices constitute a RAID,
wherein the processor is configured to provide a host with storage areas of the plurality of storage devices as one or more logical volumes and process access from the host to the logical volume or logical volumes,
wherein the processor is configured to judge, with respect to a logical volume accessed from the host, whether or not the access is made to a specified area of the logical volume which requires a rebuild operation, and
when an affirmative judgment result is obtained for this judgment, the processor is configured to execute the rebuild operation in accordance with configuration information about whether or not to prioritize the rebuild operation over access processing from the host to the logical volume.

3. The storage system according to claim 2, wherein:
the configuration information includes first information for prioritizing the rebuild operation over the access processing, and
when the access is made to the logical volume, the processor is configured to prioritize execution of the rebuild operation on the specified area over the access processing on the basis of the first information.

4. The storage system according to claim 3, wherein the processor is configured to execute collection copying as the rebuild operation.

5. The storage system according to claim 4, wherein the processor is configured to restore data of the specified area and copy the restored data to a copy destination area as the collection copying.

6. The storage system according to claim 2, wherein:
the configuration information includes second information for the processor to judge whether or not to prioritize the rebuild operation over the access processing according to a load caused by the access to the logical volume, and
the processor is configured to execute the rebuild operation based on the second information.

7. The storage system according to claim 6, wherein if the load is smaller than a specified value when the access is made to the logical volume, the processor is configured to prioritize execution of the rebuild operation on the specified area over the access processing.

8. The storage system according to claim 7, wherein if the load is larger than or equal to the specified value, the processor is configured to prioritize execution of the access processing over the rebuild operation.

9. The storage system according to claim 8, wherein the processor is configured to execute the rebuild operation without synchronization with the access.

10. The storage system according to claim 7, wherein the processor is configured to execute collection copying as the rebuild operation.

11. The storage system according to claim 10, wherein the processor is configured to restore data of the specified area and copy the restored data to a copy destination area as the collection copying.

12. The storage system according to claim 1, wherein the plurality of data elements included in the plurality of stripe rows are dispersively stored in the plurality of storage devices, such that a first combination of stripe rows having data elements stored in a first storage device is different from a second combination of stripe rows having data elements stored in a second storage device.

13. The storage system according to claim 1, wherein the plurality of data elements included in the plurality of stripe rows are dispersively stored in the plurality of storage devices, such that no physical storage device stores data elements from an identical set of stripe rows.

* * * * *